US007780039B2

(12) United States Patent
Criswell et al.

(10) Patent No.: US 7,780,039 B2
(45) Date of Patent: Aug. 24, 2010

(54) SOAP DISPENSING PUMP HEAD WITH VACUUM APPLYING DRIP GUARD MEMBER

(75) Inventors: Scott Criswell, St. Louis, MO (US); Casey B. Stahl, Lake Zurich, IL (US); Mark Hirte, Deerfield, IL (US); Lawrence R. Happ, Mundelein, IL (US)

(73) Assignee: Buckeye International, Inc., Maryland Heights, MO (US)

(*) Notice: Subject to any disclaimer, the term of this patent is extended or adjusted under 35 U.S.C. 154(b) by 1000 days.

(21) Appl. No.: 11/413,389

(22) Filed: Apr. 28, 2006

(65) Prior Publication Data

US 2007/0251953 A1 Nov. 1, 2007

(51) Int. Cl.
*G01F 11/00* (2006.01)

(52) U.S. Cl. ..................... 222/108; 222/321.3; 222/571

(58) Field of Classification Search ............. 222/321.2, 222/108, 571, 375, 110, 190, 630–633; 137/312; 141/119; 239/119, 120
See application file for complete search history.

(56) References Cited

U.S. PATENT DOCUMENTS 2,591,969 A 4/1952 Sawchuk
2,772,116 A 11/1956 Dobkin
3,653,554 A 4/1972 Turben
4,901,925 A 2/1990 Blake, III
4,978,035 A * 12/1990 Morane et al. .............. 222/108
4,991,779 A 2/1991 Blake, III
5,238,155 A 8/1993 Blake, III
5,363,993 A * 11/1994 Mascitelli et al. ........ 222/321.9
5,445,288 A 8/1995 Banks
5,752,626 A 5/1998 Bachand
5,755,384 A 5/1998 Foster et al.
5,857,591 A 1/1999 Bachand
6,053,364 A 4/2000 van der Heijden
6,082,586 A 7/2000 Banks
6,321,943 B1 11/2001 Strickler et al.
2002/0008117 A1 1/2002 Strickler et al.

FOREIGN PATENT DOCUMENTS

DE 10316692 B3 11/2004
EP 0722780 A2 7/1996
EP 1334683 A1 8/2003
WO 9712686 A1 4/1997

OTHER PUBLICATIONS

Best Sanitizers, Inc. brochure, SANISHOT Manual Hand Care Dispenser, undated, 2 pages.
Stoko SkinCare brochure, Stoko Refresh Foam Soap dispenser, 2004, 3 pages, Stockhausen, Inc.
Bentfield Foam Soap Dispenser brochure, undated, 2 pages.

* cited by examiner

*Primary Examiner*—Kevin P Shaver
*Assistant Examiner*—Jonathan Wood
(74) *Attorney, Agent, or Firm*—Senniger Powers LLP

(57) ABSTRACT

A pump head assembly for a soap container. The pump head including a drip guard member which applies a vacuum to an internal passageway of the pump head assembly following dispensing of soap in order to draw an residual soap out of the internal passageway and thus prevent dripping.

17 Claims, 27 Drawing Sheets

SOAP DISPENSING PUMP HEAD WITH VACUUM APPLYING DRIP GUARD MEMBER

BACKGROUND OF INVENTION

The present invention relates generally to soap dispensing and apparatus for accomplishing the same.

Public restrooms, and other places where hand cleaning occurs, nearly always have either foamed soap or liquid soap available for use. Typically, the foamed soap is delivered from a dedicated dispenser for dispensing only foamed soap, while the liquid soap is delivered from different type of dedicated dispenser for dispensing only liquid soap. A dispenser for foamed soap includes a pump that mixes air and soap from a container to produce the foamed soap. A dispenser for liquid soap includes a conventional liquid pump to deliver liquid soap.

Accordingly, in view of the exemplary conventional systems for dispensing soap discussed above, a manufacturer must produce separate dedicated dispensers for the foamed and liquid soap and distinct foamed soap and liquid soap containers to use with these dedicated dispensers. Producing separate container and dispensers, or at the very least, separate dispensers, is expensive and inefficient. Moreover, if a consumer presently has a liquid soap dispenser but wants to switch to a foamed soap, the consumer must buy a new foamed dispenser and have the old liquid dispenser removed. Moreover still, if the consumer wants both liquid soap and foamed soap, then the consumer must install both a liquid dispenser and a foamed dispenser, and cannot use the dispensers interchangeably.

In view of the above disadvantages, it is desirable to have a system that allows for a consumer to purchase a universal dispenser that can receive both a foamed container and a liquid container. Such a system or assembly is more cost effective and easier for both the consumer and the manufacturer than the traditional system.

SUMMARY OF INVENTION

In one aspect, a method of merchandising soap for dispensing in liquid or foaming form as desired by the customer comprises providing universal dispensers for mounting in locations where soap is to be dispensed. The method further comprises offering to sell a first soap container filled with soap and having a liquid pump supported by the first container for pumping soap out of the first container and discharging the soap in liquid form. The first container and liquid pump of the first container are sized and shaped for reception in all of the universal dispensers provided. The universal dispensers are adapted to actuate the liquid pumps in the universal dispensers to dispense soap in liquid form from the liquid dispenses. The method still further comprises offering to sell a second soap container filled with soap having a foaming pump supported by the second container for introducing air into the soap and discharging the soap from the second container in foamed form. The bag and pump of the second container are sized and shaped for reception in all of the universal dispensers provided. The universal dispensers are adapted to actuate the foaming pumps in the universal dispensers to dispense soap in a foamed form from the universal dispensers.

In another aspect, a soap container for use in dispensing soap in liquid or foamed form comprises a bag formed of limp sheet material defining a volume for containing a quantity of soap. A pump mount is connected to the bag for providing fluid communication through the bag. The pump mount is constructed to alternatively attach a liquid pump capable of dispensing soap from the bag in liquid form and a foaming pump capable of dispensing soap from the bag in a foamed form. The pump mount is adapted to locate a pump actuator of the liquid pump or a pump actuator of a foaming pump in a position relative to the mount.

In yet another aspect, a process of manufacturing soap containers for dispensing soap in a liquid form and soap containers for dispensing soap in a foamed form comprises forming bags of limp sheet material. The bags define a space for containing soap in liquid form, and each of the bags has substantially the same size and shape. The process also comprises mounting a liquid pump on a first number of the formed bags. The mounted liquid pump is capable of pumping soap from the bag and discharging the soap in a liquid form. The process further comprises mounting a foaming pump on a second number of the formed bags. The mounted foaming pump is capable of pumping soap from the bag and discharging the soap in a foamed form.

In yet another aspect, a universal dispenser comprises a universal pump holder adapted to releasably retain in a preselected location relative to the pump holder both a foaming pump of a first soap container and a separate liquid pump of a second soap container within the dispenser. Only one pump is retained at one time.

In another aspect, a pump head for use in dispensing soap while inhibiting dripping of soap comprises a body having an inlet for receiving soap, an outlet for dispensing soap and an internal passageway extending from the inlet to the outlet for transporting the soap through the body. A drip guard member is attached to the body and is in fluid communication with the internal passageway. The drip guard member is constructed to apply a vacuum to the internal passageway following dispensing of the soap to draw any residual soap in the internal passageway out of the internal passageway to inhibit dripping.

In yet another aspect, a method of replacing soap bags within a dispenser comprises placing one of a first soap bag having a foaming pump and a second soap bag having a liquid pump in the dispenser. The method further comprises replacing the one of a first soap bag and a second soap bag with the other one of the first soap bag and the second soap bag in the same dispenser.

Other objects and features will be in part apparent and in part pointed out hereinafter.

BRIEF DESCRIPTION OF THE DRAWINGS

FIG. 1OF is a perspective of the foaming pump of FIG. 10D received in the first clamping ring of FIG. 10E another embodiment of a foaming pump;

Corresponding reference characters indicate corresponding parts throughout the drawings.

DETAILED DESCRIPTION OF THE DRAWINGS

Figure 1:
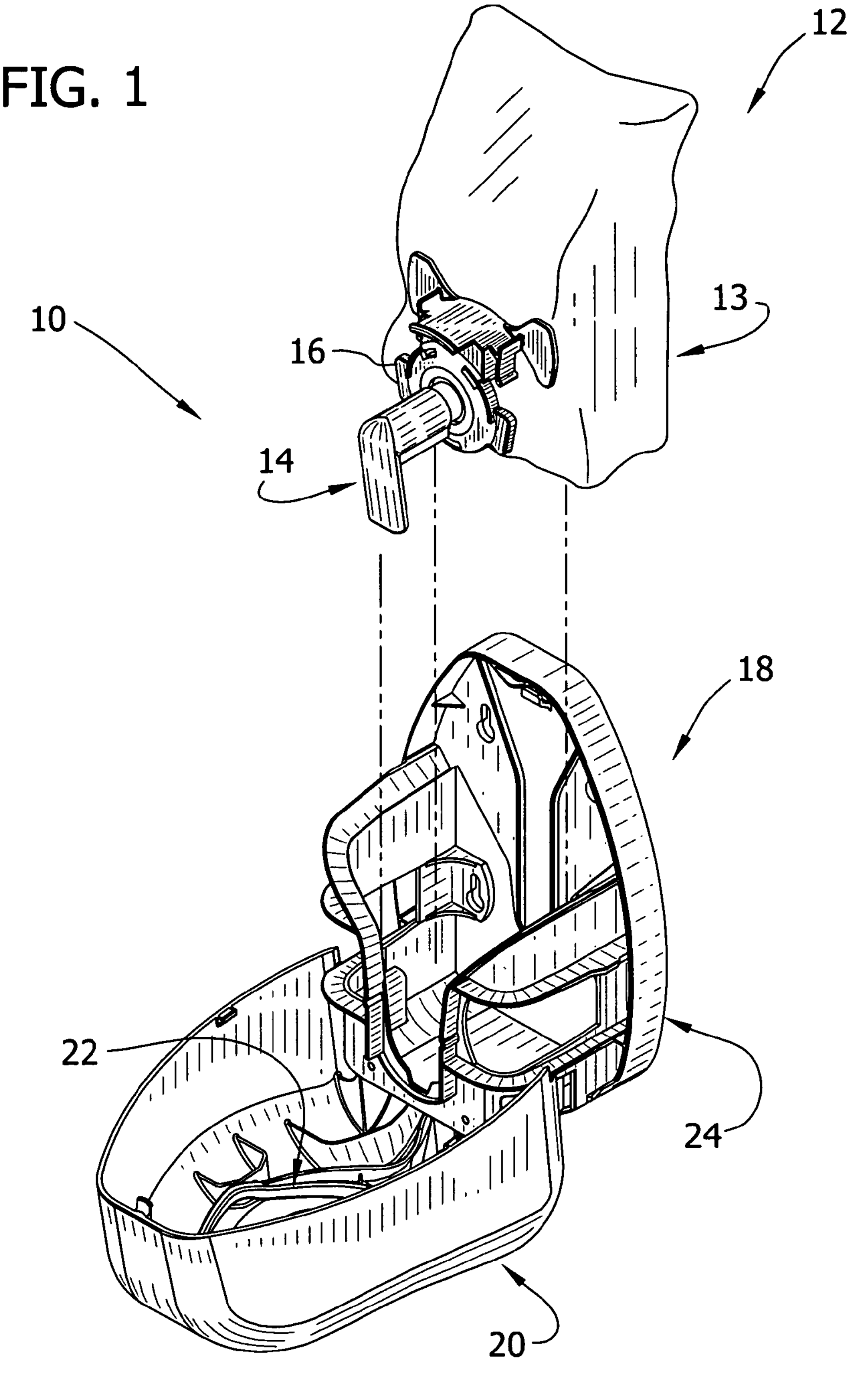
FIG. 1 is a perspective of a soap dispensing assembly with a soap container exploded from a dispenser.

Referring now to the drawings, and in particular to FIG. 1, a soap dispensing assembly is generally indicated at 10. The soap dispensing assembly 10 comprises a soap container, generally indicated at 12, having a bag 13 and a foaming pump 14 for dispensing foamed soap from the bag (the reference numbers indicating their subjects generally). The foaming pump 14 is mounted on the bag 13 using a pump mount 16. As explained in more detail below, the container 12 alternatively can have a liquid pump (FIGS. 4 and 5) for dispensing liquid soap. The assembly 10 also comprises a dispenser, generally indicated at 18. The dispenser 18 has a cover 20 with an actuator 22 for actuating pumping action of the pump 14 and a container mount 24 for receiving and retaining the container 12 (the numbers designating their subjects generally).

Figure 2:
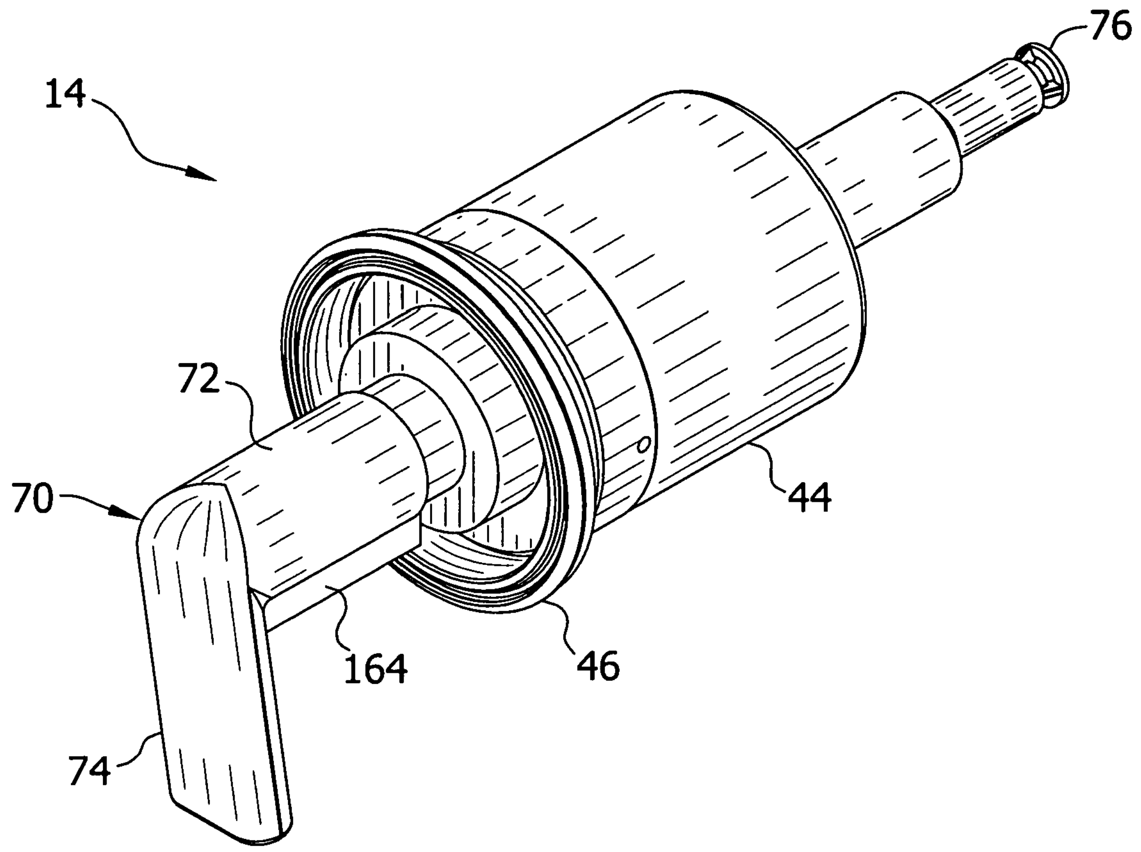
FIG. 2 is a perspective of a foaming pump for use with the soap dispensing assembly.
Figure 3:
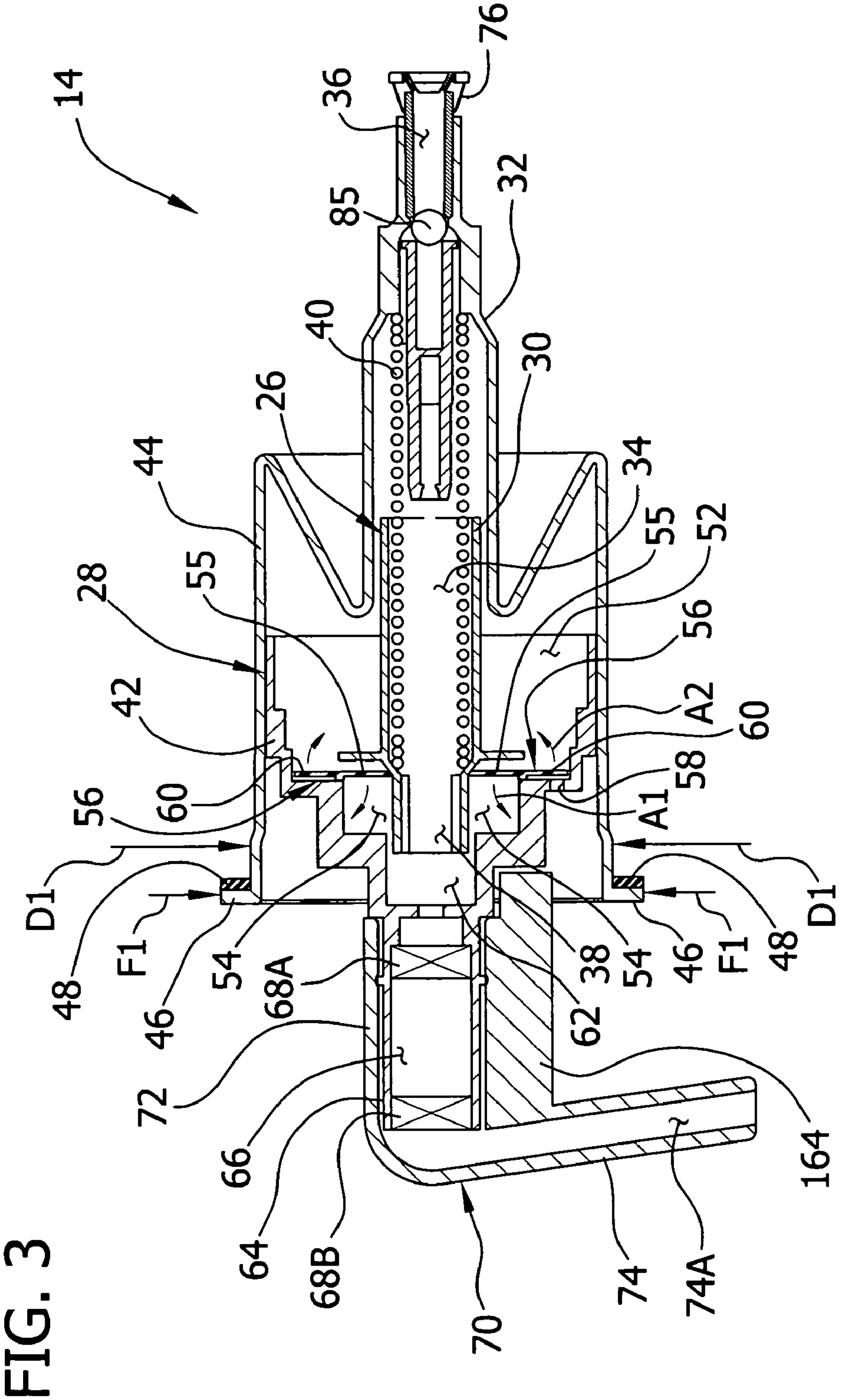
FIG. 3 is a longitudinal section of the foaming pump.
Figure 3A:
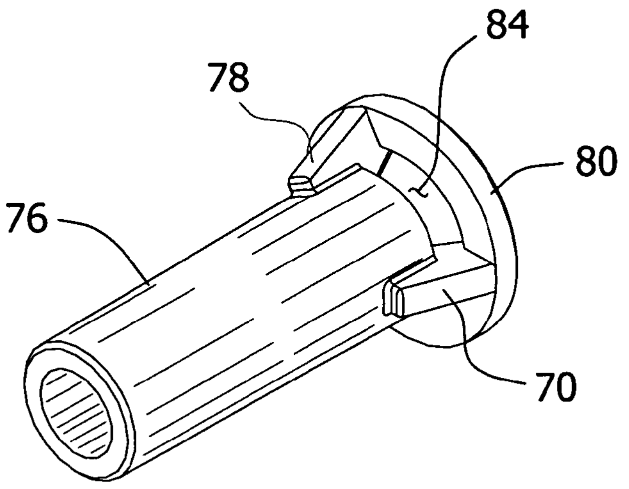
FIG. 3A is a rear perspective of a inlet port member of the pump.

Referring to FIGS. 2 and 3, the basic construction and operation of the foaming pump 14 will be briefly described. The foaming pump 14 comprises both a liquid pump mechanism, generally indicated at 26, and an air pump mechanism, generally indicated at 28 (FIG. 3). The liquid pump mechanism 26 includes a generally tubular liquid piston 30 partially received in a generally tubular liquid cylinder 32 of the pump 14, which together at least partially define a liquid passageway 34. The liquid is pumped from an inlet 36 of the liquid passageway 34 to an outlet 38 of the liquid passageway. A spring 40 is received in the liquid piston 30 and liquid cylinder 32 for biasing the piston in a forward position.

The air pump mechanism 28 of the foaming pump 14 comprises an annular air piston 42 received in an air cylinder 44 having a diameter D1. The air cylinder 44 projects radially outward from and partially surrounds the liquid pump mechanism 26. An annular flange 46 having a diameter F1 projects radially from the air cylinder 44. A gasket 48 (e.g., an O-ring) is secured around a corresponding side of the annular stop 46 such that it faces toward the inlet 36 of the liquid passageway 34.

The air piston 42 has a central cavity, which together with the air cylinder 44 defines an air chamber 52. The spring 40 of the liquid piston 30 biases the air piston 42 in a forward position. An air passageway 54 having an inlet and an outlet is defined by the air piston 42 and the liquid piston 30. An inner flap 55 of an annular check valve 56 covers the inlet of the air passageway 54 to permit air to only flow from the air chamber 52 into the air passageway. The inner flap 55 is biased to a closed position, in which the passageway 54 is not fluidly communicating with the air chamber 52. A plurality of air holes 58 (only one is shown) extend through the air piston 42 into the air chamber 52 for replenishing the air chamber with air from outside the pump 14. Within the air cylinder 44, an outer flap 60 of the annular check valve 56 covers the air holes 58 to permit air to only flow into, and not out of, the air chamber 52 via the holes. The outer flap 60 is biased to a closed position in which the air chamber 52 is not fluidly communicating with air from outside the pump 14. The inner and outer flaps, 54, 60 are separated by an annular ridge 61 that acts as a fulcrum on which each of the flaps pivots to operate.

A mixing chamber 62 is in fluid communication with the respective outlets of the air passageway 54 and the liquid passageway 34. Liquid and air entering the mixing chamber 62 from the respective outlets briefly mix in the mixing chamber and before entering a foaming component 64. The foaming component 64 comprises a central passageway 66 and a pair of opposing first and second foaming screens 68A, 68B, respectively, disposed at opposite ends of the central passageway. As the mixed air and liquid from the mixing chamber 62 pass through the first screen 68A and into the central passageway 66, the air and liquid mixture begins to foam. The foamed mixture foams even more as it passes through the second screen 68B and out the foaming component 64. A pump head, generally indicated at 70, is in fluid communication with the foaming component 64 to direct the foamed soap downward out of the foaming pump 14. Referring to FIG. 3, the head 70 has a first tubular portion 72 for receiving the foaming component 64 of the pump 14 and an exit portion 74 having an internal passageway 74A extending downward from and in fluid communication with the tubular first portion for directing foamed soap downward onto hands of a user.

Figure 3B:
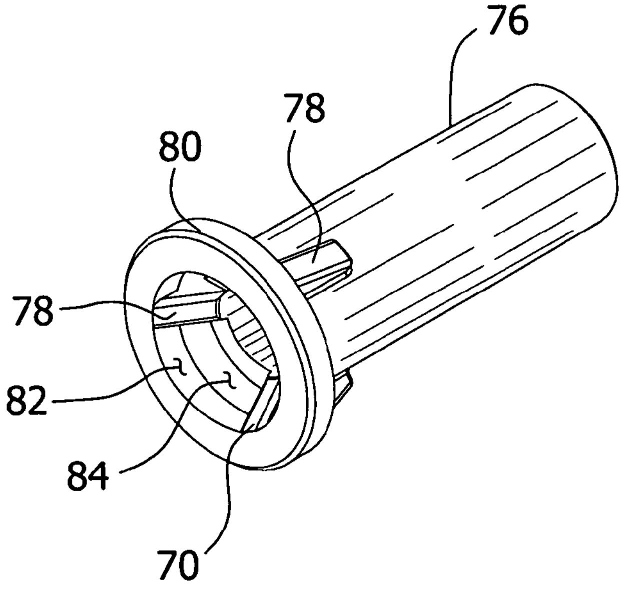
FIG. 3B is a front perspective of the inlet port member of FIG. 3A.

Referring to FIGS. 2-3B, a tubular inlet port member 76 is received in the inlet 36 of the liquid passageway 34. A plurality of spaced apart, axially extending ribs 78 connect an end ring 80 to the port member 76. The end ring 80 is substantially coaxial with the liquid passageway 34. Together the end ring 80 and the spaced apart ribs 78 define both an axial port opening 82, defined by an opening of the end ring, and a plurality of radial port openings 84, defined by the ring and the spaced apart ribs. The axial and radial port openings 82, 84, respectively, allow continuous fluid communication between the inlet 36 of the passageway 34 and the volume of soap in the container 12 if one of the ports becomes blocked or clogged. For example, when the container 12 comprises a flexible bag, the vacuum created by the pump 14 may suck the flexible bag into the axial port opening 82 after much of the soap has been removed from the bag. The liquid passageway

34 remains in fluid communication with the soap, however, because the radial port openings 84 remain open.

In use, force is applied to the pump head 70, such as by an actuator, to move the air piston 42 and the liquid piston 30 rearward in the respective air and liquid cylinders 44, 32, respectively. The movement of the liquid piston 30 forces liquid present in the liquid passageway 34 into the mixing chamber 62, and movement of the air piston 42 forces air present in the air passageway 54 and the air chamber 52 into the mixing chamber. The air moving from the air chamber 52 into the air passageway 54 opens the inner flap 55 of the check valve 56 (as indicated by the arrows A1 in FIG. 3) and the outer flap 60 remains in its closed position. As air and liquid continue to enter the respective passages 54, 34, respectively, and the mixing chamber 62 during the rearward movement of the pistons 42, 30, air and liquid mix briefly in the mixing chamber and travel into the foaming component 64 where the screens 68A, 68B foam the mixture. The foamed soap exits downward through the exit portion 74 of the head 70 and into the hands of the user.

When the force is removed from the head 70, the spring 40 moves the liquid piston 30 and the air piston 42 forward to their original positions. The forward movement of the liquid piston 30 creates a vacuum in the liquid passageway 34 which lifts ball check valve 85 off its seat and draws the soap from the container 13 into the liquid passageway through the inlet port member 76. The forward movement of the air piston 42 similarly creates a vacuum in the air chamber 52 that draws air through the air holes 58 in the air piston into the air chamber. The air entering through the holes 58 opens the outer flap 60 of the check valve 56 (as indicated by the arrows A2 in FIG. 3) and the inner flap 55 remains closed. When the pistons 30, 42 return to their original positions, the pump 14 may again be operated to dispense foamed soap. The foaming pump 14 may be of other constructions without departing from the scope of this invention. For example, a similar foaming pump is described in U.S. Pat. No. 6,053,364, assigned to Airspray N.V., the entirety of which is herein incorporated by reference.

Figure 4:
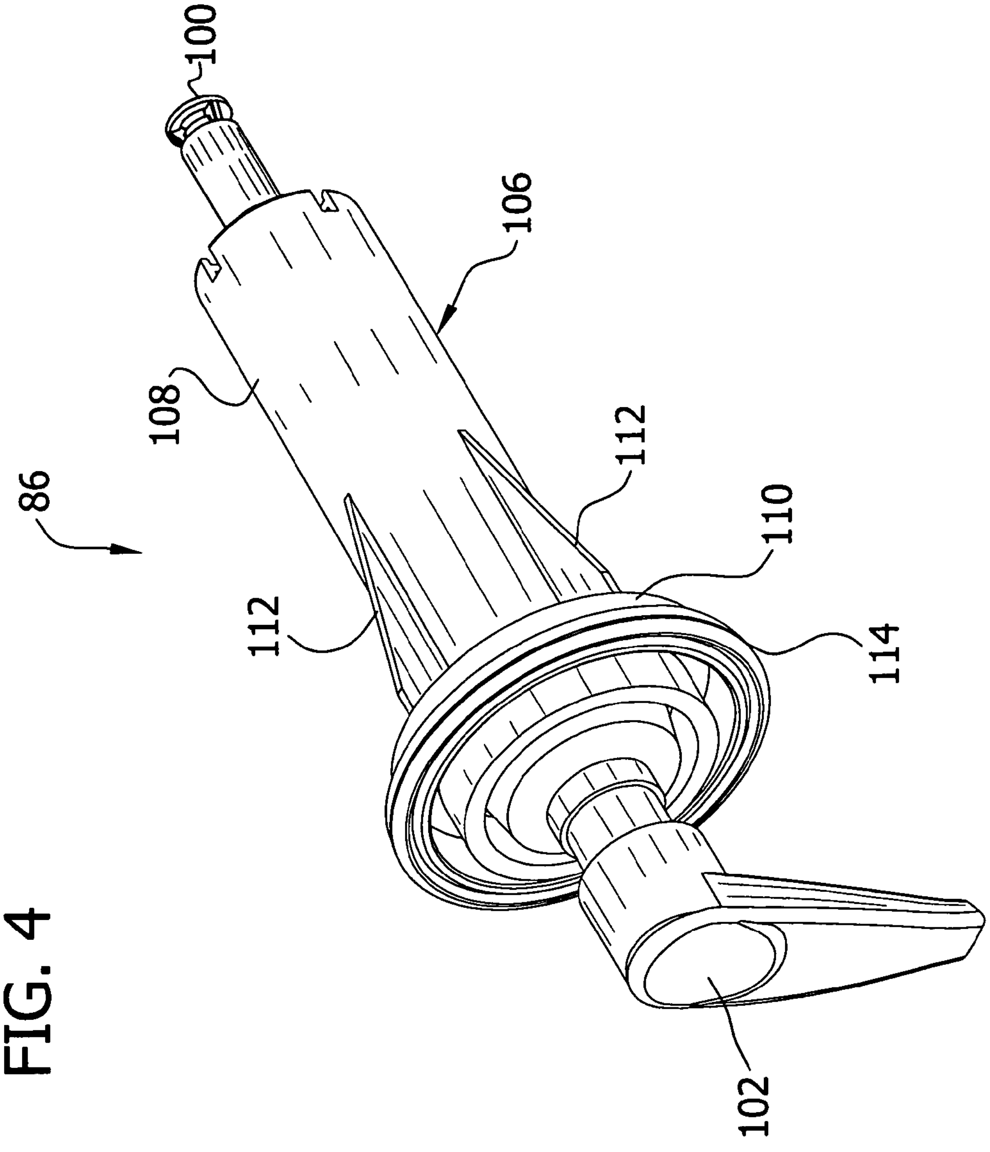
FIG. 4 is a perspective of a liquid pump for use the soap dispensing assembly.
Figure 5:
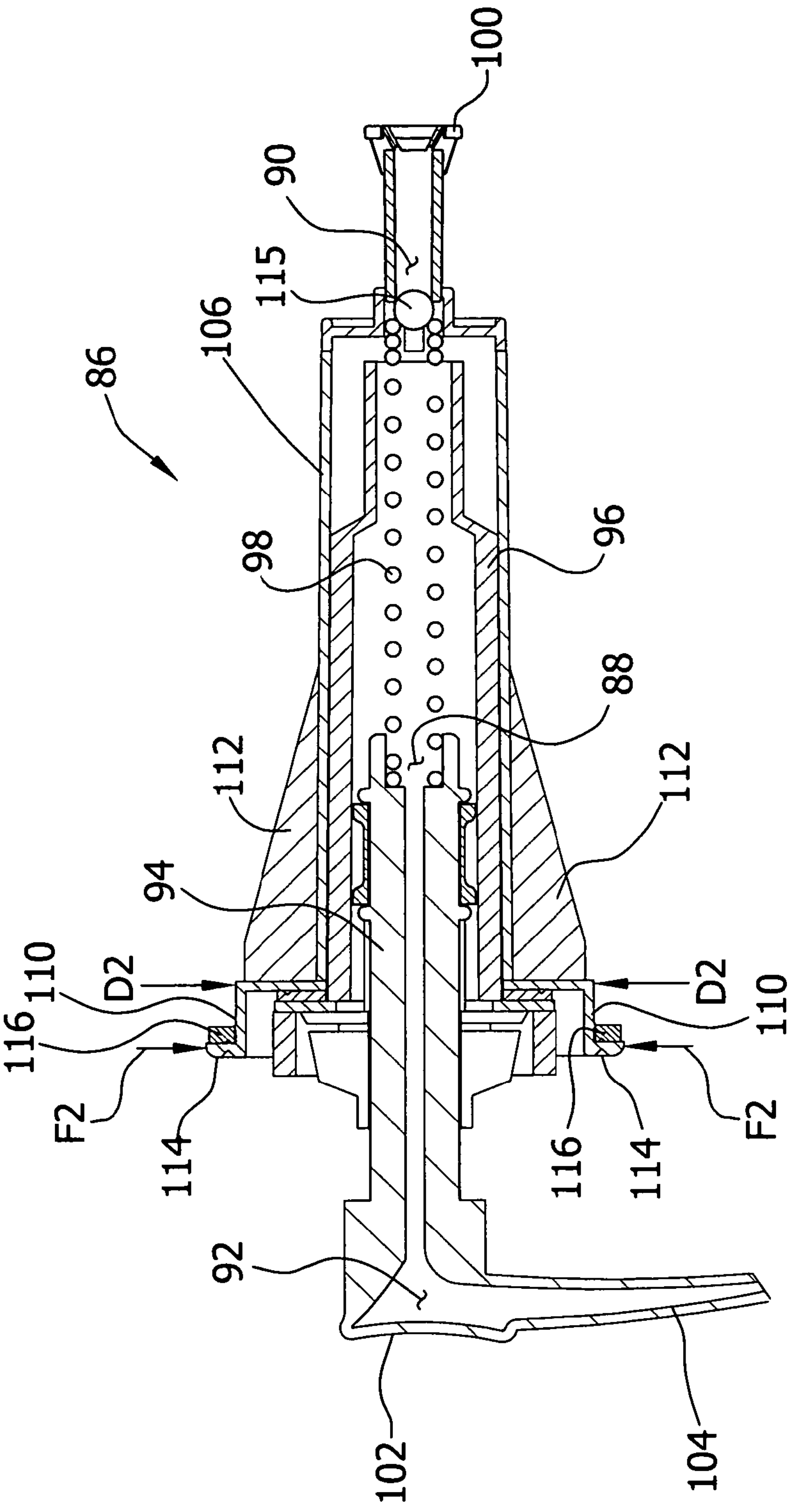
FIG. 5 is a longitudinal section of the liquid pump.

Referring to FIGS. 4 and 5, an exemplary liquid pump suitable for use in pumping liquid soap from the soap container 12 is generally indicated at 86. The liquid pump 86 is generally elongate and includes a longitudinal liquid passageway 88 (FIG. 5) having an inlet 90 and an outlet 92. The pump 86 comprises a generally tubular piston 94 partially received in a cylinder 96 of the pump. Interior surfaces of the piston 94 and cylinder 96 together define at least a portion of the liquid passageway 88. A spring 98 received in the cylinder 96 biases the piston 94 in a forward position. Reciprocal longitudinal movement of the piston 94 in the cylinder 96 creates a pumping action that pumps liquid into the inlet 90, through the liquid passageway 88, and out the outlet 92.

The liquid pump 86 includes an inlet port member 100 of substantially the same construction and operation as the inlet port member 76 of the foaming pump 14 described above. The pump 86 also includes a head 102 that is integrally formed with the piston 94. Alternatively, the head 102 and the piston 94 may be formed separately. The head 102 includes an exit portion 104 for directing the liquid soap downward as it exits the pump 86. It will be understood that a head may be configured differently without departing from the scope of this invention.

For purposes discussed below, an adapter sleeve 106 is received on the liquid pump 86. The adapter sleeve 106 includes a collar 110 having a diameter D2. A plurality of ribs 112 projecting radially from the sleeve 106 are secured to the ring member 110 for support. An annular flange 114 having a diameter F2 projects radially from a forward end margin of the ring member 110. A gasket 116 (e.g., a flat O-ring), similar to the gasket 48 of the foaming pump 14, is secured to a corresponding side of the annular stop 114 such that it faces toward the inlet 90 of the liquid passageway 88. The adapter sleeve 106 may be formed separate from the liquid pump 86 and sized and shaped to be slidably received thereon, or alternatively, the adapter sleeve and the pump may be integrally formed. For reasons discussed below, the diameter D1 of the air cylinder 44 of the foaming pump 14 and the diameter D2 of the ring member 110 of the adapter sleeve 106 may be about the same, and the diameters F1, F2 of the annular stops 46, 114 of the separate pumps 14, 86 may also be about the same.

In use, force is applied to the head 102 of the pump 86, such as by an actuator, to move the piston 94 rearward in the cylinder 96. This movement forces liquid already present in the liquid passageway 88 to flow through the outlet 92 and through exit portion 104 of the head 102 and onto the hands of the user. When the force is removed from the head 102, the spring 98 moves the piston 94 forward to its original position. This movement creates a vacuum in the liquid passageway 88 which lifts ball check valve 115 off its seat and draws liquid from the container 12 through the inlet port member 100 and into the liquid passageway 88. The liquid pump 86 may be of other constructions without departing from the scope of this invention.

Figure 6:
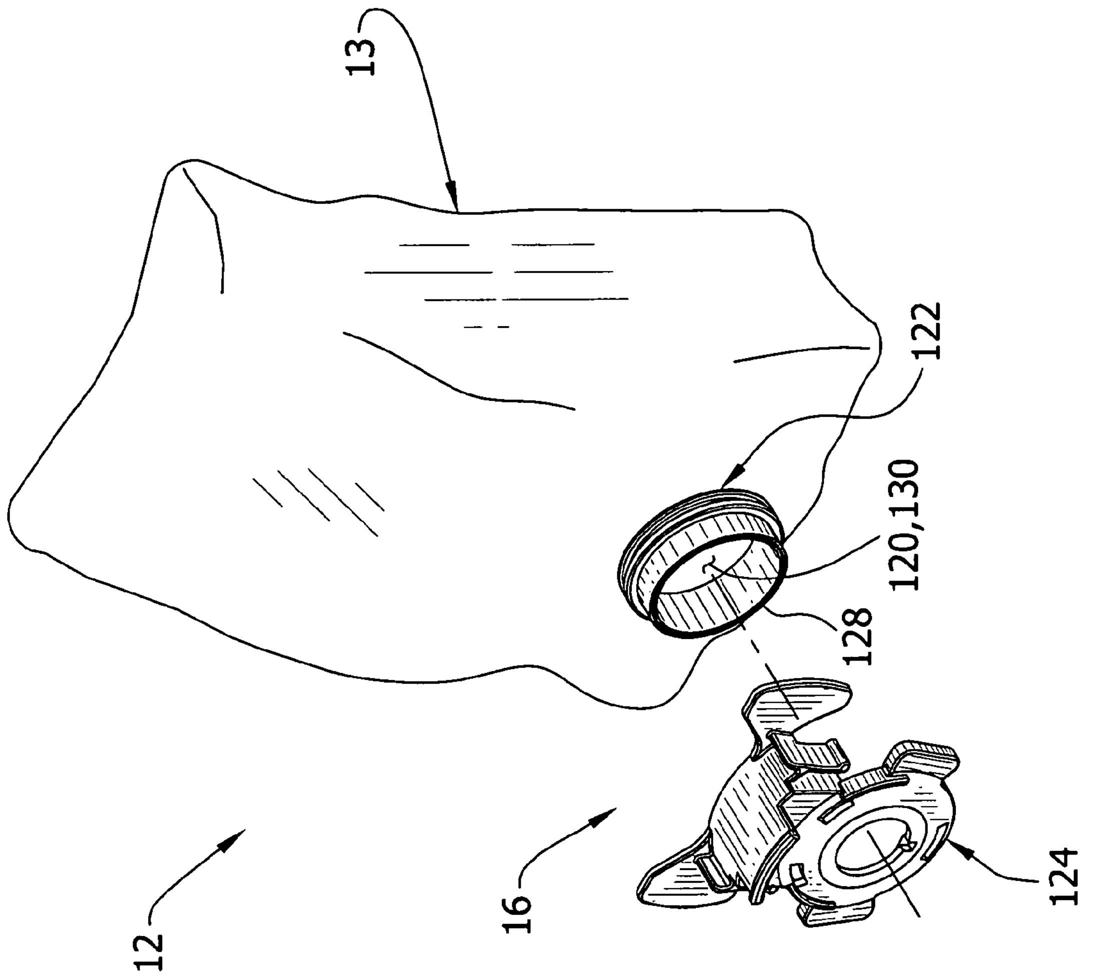
FIG. 6 is a perspective of the soap container with a second clamping ring exploded from a first clamping ring.

Referring now to FIG. 6, as described above the soap container 12 comprises the bag 13 and the pump mount 16 for securing a selected pump 14, 86 (i.e., either the liquid pump or the foaming pump) to the bag. Either the liquid pump 14 or the foaming pump 86 may be secured to the bag 13 using the same pump mount 16. The bag 13 may be constructed of a pair of limp, rectangular sheets. One of the sheets has an opening 120 for receiving the pump 14, 86. To form the bag 13, the sheets may be superposed and then secured together, such as by heat sealing, around their perimeters. The sheets may be formed from plastic, such as polypropylene, or any other flexible material suitable for holding and retaining soap therein. Other suitable constructions and ways of forming the bag 13 may be used without departing from the scope of the present invention. For instance, a soap container could have a more rigid construction.

Figure 7:
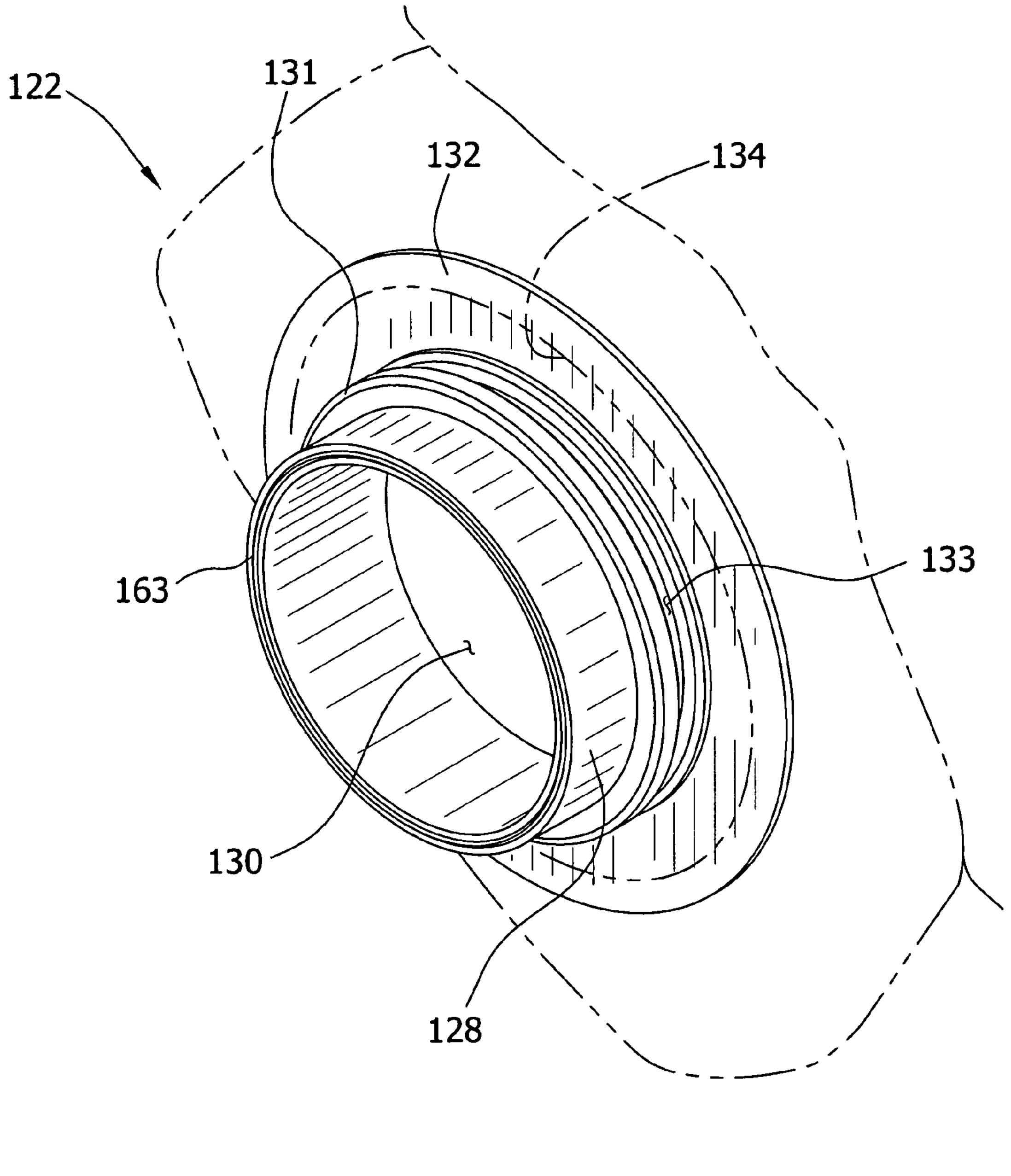
FIG. 7 is an enlarged perspective of the first clamping ring.

The pump mount 16 includes a first clamping ring, generally indicated at 122, and a second clamping ring, generally indicated at 124. Referring to FIGS. 6 and 7, the first clamping ring 122 has a short tubular body 128 with first and second ends and a pump opening 130 extending therethrough. An annular ridge 131 projects radially from the tubular body 128. An annular flange 132 projects radially outward from the second end of the body 128 for securing the ring 122 to the bag 13 (FIG. 7). The ridge 131 and flange 132 define an annular groove 133. The first clamping ring 122 is secured within the pump opening 120 of the bag 13 so that at least a portion of the annular flange 132 is disposed within the bag and at least a portion of the tubular body 128 is disposed outside the bag. In this construction, the pump opening 130 of the first clamping ring 122 is in fluid communication with the volume of the bag 13. As shown in FIG. 7, an edge margin of the bag 13, shown in phantom at 134, and defining the opening 120 may be heat sealed to the annular flange 132. Other ways of securing the first clamping ring 122 to the bag 13, such as by adhesive, are within the scope of this invention.

Figure 10:
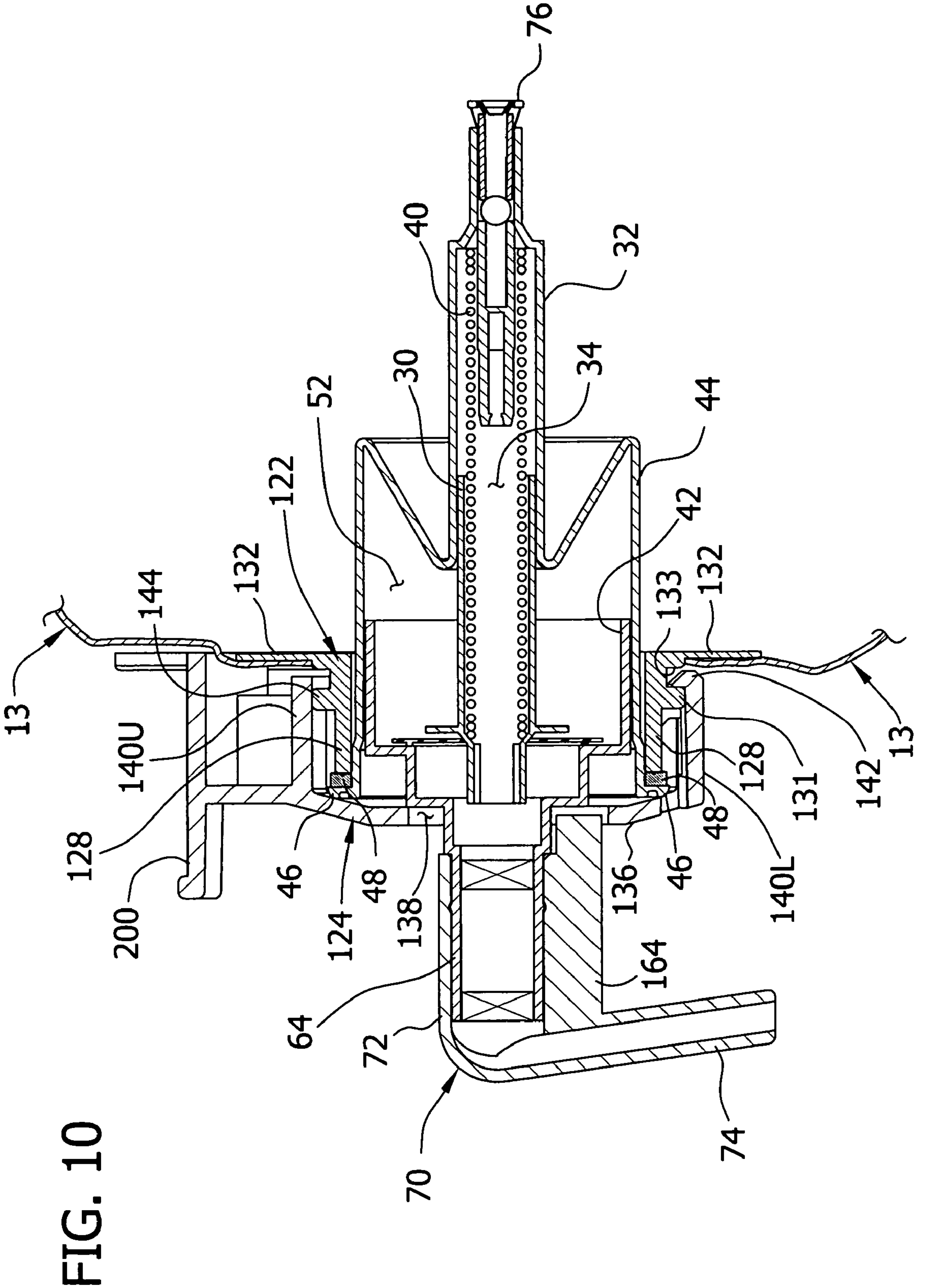
FIG. 10 is a schematic, fragmentary longitudinal section of the foaming pump secured to the soap container.

The pump opening 130 of the first clamping ring 122 is sized and shaped to snugly receive one of the ring member 110 of the adapter sleeve 106 of the liquid pump 86 and the air cylinder 44 of the foaming pump 14, but not the respective annular flanges 46, 114 (FIG. 10). Accordingly, the diameter of the pump opening 130 is slightly larger than the diameters D1, D2, respectively, of the collar 110 and the air cylinder 44, and is smaller than the diameters F1, F2 of the annular flanges 46, 114. Each flange 46, 114 prevents further longitudinal movement of the respective pump 14, 86 into the bag 13. It is understood that the liquid pump 86 may be sized and shaped essentially identical to the foaming pump 14 so that the adapter sleeve 106 is not necessary.

Figure 8:
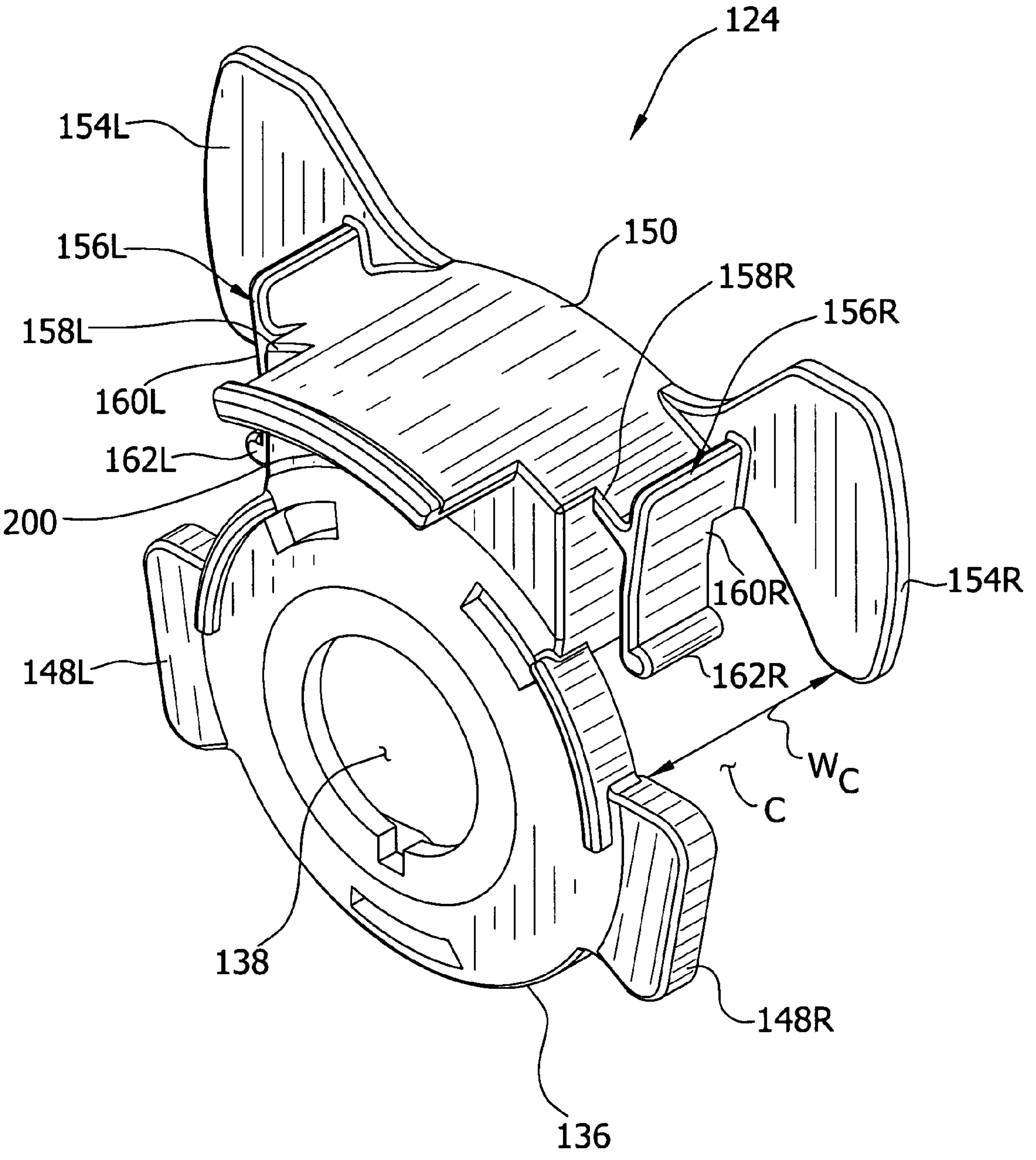
FIG. 8 is an enlarged front perspective of the second clamping ring.
Figure 8A:
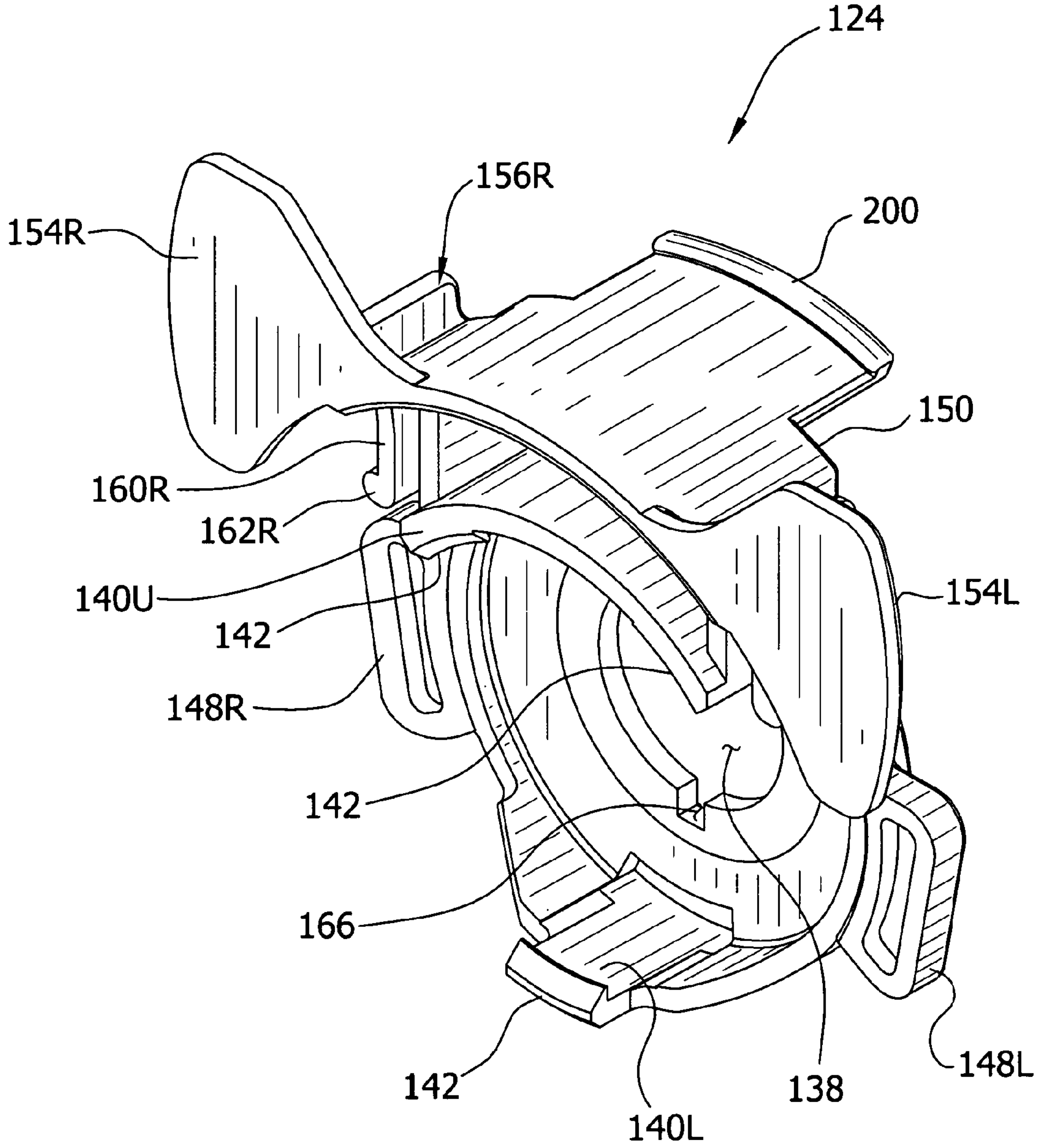
FIG. 8A is an enlarged rear perspective of the second clamping ring.

Referring to FIGS. 6, 8 and 8A, the second clamping ring 124 includes an annular faceplate 136 having a central opening 138. Upper and lower snap-fit arms 140U, 140L, respectively, project rearward from the periphery of the faceplate 136 (FIG. 8A). The lower snap-fit arm 140L has a hook 142 extending radially inward from a free end margin of the arm while the upper snap-fit arm 140U has a pair of hooks extending radially inward from a free end margin of the arm. The snap-fit arms 140U, 140L are adapted to secure to the first clamping ring 122 so that the faceplate 136 of the second ring 124 is disposed over the pump opening 130 of the first clamping ring. As explained in more detail below, the snap-fit arms 140U, 140L are received in the groove 133 defined by the ridge 131 of the first clamping ring 122 (see FIG. 10). Other ways of securing the clamping rings 122, 124 together, besides the use of a snap-fit connection, including a threaded connection and a friction-fit connection, are within the scope of this invention.

For purposes discussed below, the second clamping member 124 also includes front tabs 148L, 148R projecting laterally from each side of the faceplate 136 and an upper extension 150 projecting rearward from the faceplate above the upper snap-fit arm 140U. Rear tabs 154L, 154R project laterally from each side of the upper extension 150 at its rear. Corresponding front and rear tabs 140L, 154L and 140R, 154R are spaced apart to define channels C, each having a width $W_C$. Disposed between both sets of front and rear tabs 148L, 154L and 148R, 154R are snap-fit components, generally indicated at 156L, 156R, respectively (FIG. 8). The snap-fit components 156L, 156R each include a spacer 158L, 158R, respectively, extending laterally from the respective side of the upper extension 150 and an elastically deformable arm 160L, 160R, respectively, extending downward from the spacer. Cylindrical, snap-fit projections 162L, 162R, respectively, project laterally from lower ends of the arms, 160L, 160R.

Figure 9:
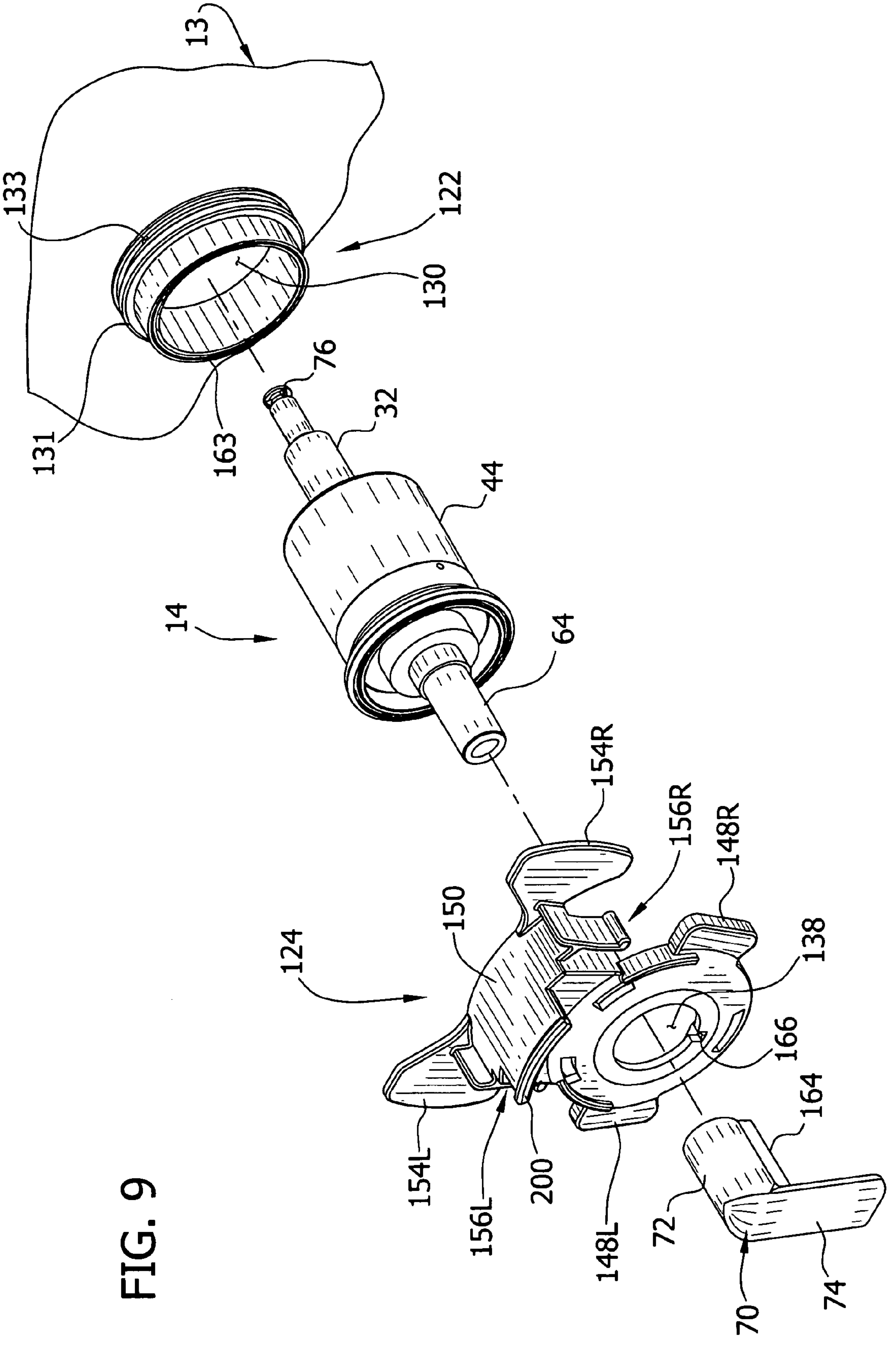
FIG. 9 is an exploded perspective of the soap container including the foaming pump.

Referring to FIG. 9, to attach a selected pump (i.e., the foaming pump 14 as shown in FIG. 9) to the bag 13 according to one embodiment, the first clamping ring 122 is attached within the opening 120 of the bag in a manner described above, for example. The bag 13 is then filled with foaming soap, although it may be filled at other times during the assembly process. The pump 14 is inserted into the pump opening 130 of the first clamping ring 122 so that the air cylinder 44 is received in the pump opening and the annular flange 46, more specifically, the gasket 48 of the annular flange, is pressed against a front edge margin 163 of the first clamping ring defining the pump opening. When the pump 14 is received in the pump opening 130, the inlet 36 of the liquid passageway 34 of the pump 14 is in fluid communication with the interior of the bag 13 (i.e., the soap in the bag). It is understood that the liquid pump 86 would be inserted in the same manner as the foaming pump 14, so that the adapter sleeve 106 is received in the pump opening 130 and the annular stop 114, more specifically, the gasket 116 of the annular stop, is pressed against the periphery of the first clamping ring 122 defining the pump opening. Moreover, the ribs 112 of the adapter sleeve 106 are beveled longitudinally toward collar 110 to easily locate the collar in the opening 130 of the first clamping ring 122 as the pump 86 is being inserted. Thus, the same clamping ring 122 can receive either the foaming pump 14 or the liquid pump 86.

After the pump 14 is received in the first clamping ring, the second clamping ring 124 is positioned over the first clamping ring 122 such that a portion of the pump extending out of the pump opening 130 is received through the central opening 138 of the second clamping ring. The second clamping ring 124 is pressed against the first clamping ring 122 so that the hooks 142 of the snap-fit arms 140U, 140L of the second clamping ring 124 slide over the annular ridge 131 as the snap-fit arms are elastically pushed outward by the ridge. After the hooks 142 of the snap-fit arms 140U, 140L slide past the ridge 131, they snap back to their original positions when they enter the groove 133 defined by the ridge and the flange 132. The first and second clamping rings 122, 124, respectively, are secured together when the hooks 142 of the snap-fit arms 140U, 140L are received in the groove 133 (FIG. 10). This method is the same for a liquid pump 86.

Referring to FIG. 10, when the clamping rings 122, 124 are secured together, the annular flange 46 and associated gasket 48 are sandwiched between the faceplate 136 of the second clamping ring 124 and the front edge margin 163 defining the pump opening 130 of the first clamping ring 122. The gasket 46 makes an air-tight seal between the pump 14 and the first clamping ring 122. This seal ensures that the soap is retained in an air-tight enclosure so that the pump 14 will operate properly when dispensing the soap. Other ways of ensuring an air tight seal is within the scope of this invention. It is understood that when the clamping rings 122, 124 secure the liquid pump 86 to the bag 13, the annular flange 114 of the adapter sleeve 106 and associated gasket 116 are sandwiched between the faceplate 136 of the second clamping ring 124 and the edge margin defining the pump opening 130 of the first clamping ring 122. The gasket 116 functions in the same manner as the gasket 48 of the foaming pump 14.

In one embodiment (FIG. 9), the head 70 includes a locating rib 164 that projects downward from the tubular first portion 72 of the head. When the head 70 is slidably received on the pump 14, the locating rib 164 is inserted into a notch 166 disposed below the central opening 138 of the second clamping ring 124 and in contiguous relationship therewith. Inserting the locating rib 164 in the notch 166 ensures that the exit portion 74 of the head 70 is properly oriented and will be pointing downward when the container 12 is received in the dispenser 18. In other words, the locating rib 164 prevents rotation of the pump head 70.

Figure 10A:
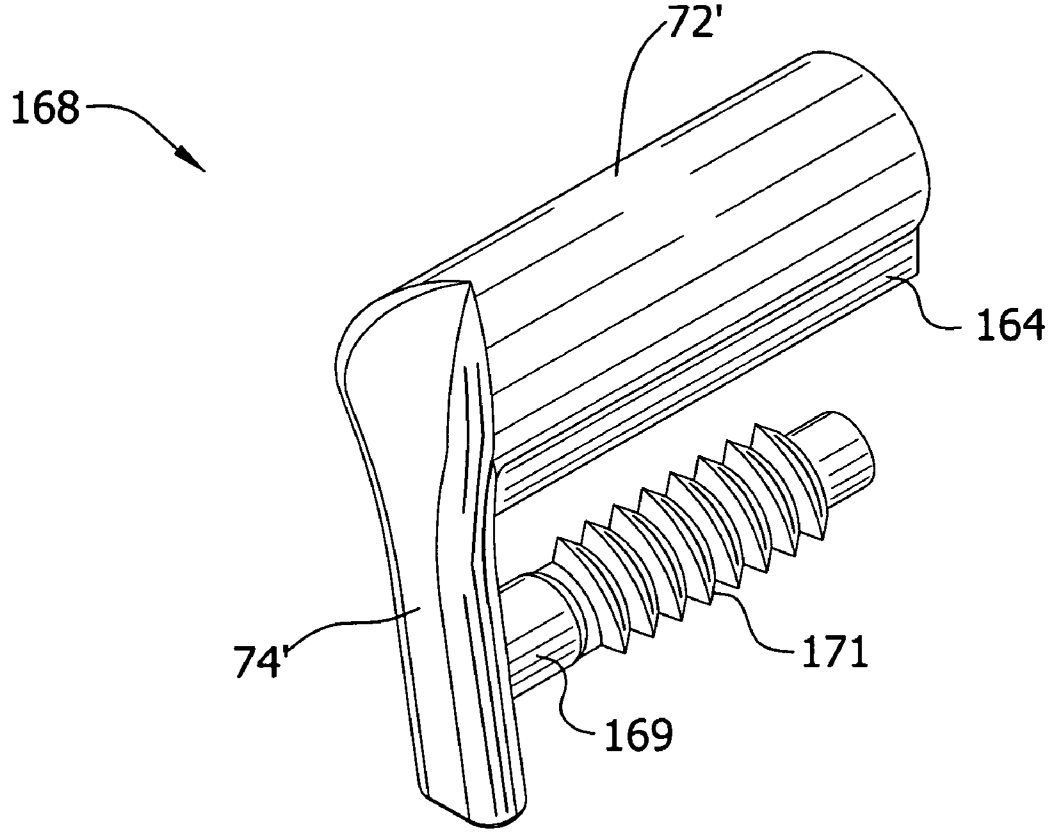
FIG. 10A is a perspective of another embodiment of a head for the foaming pump.
Figure 10B:
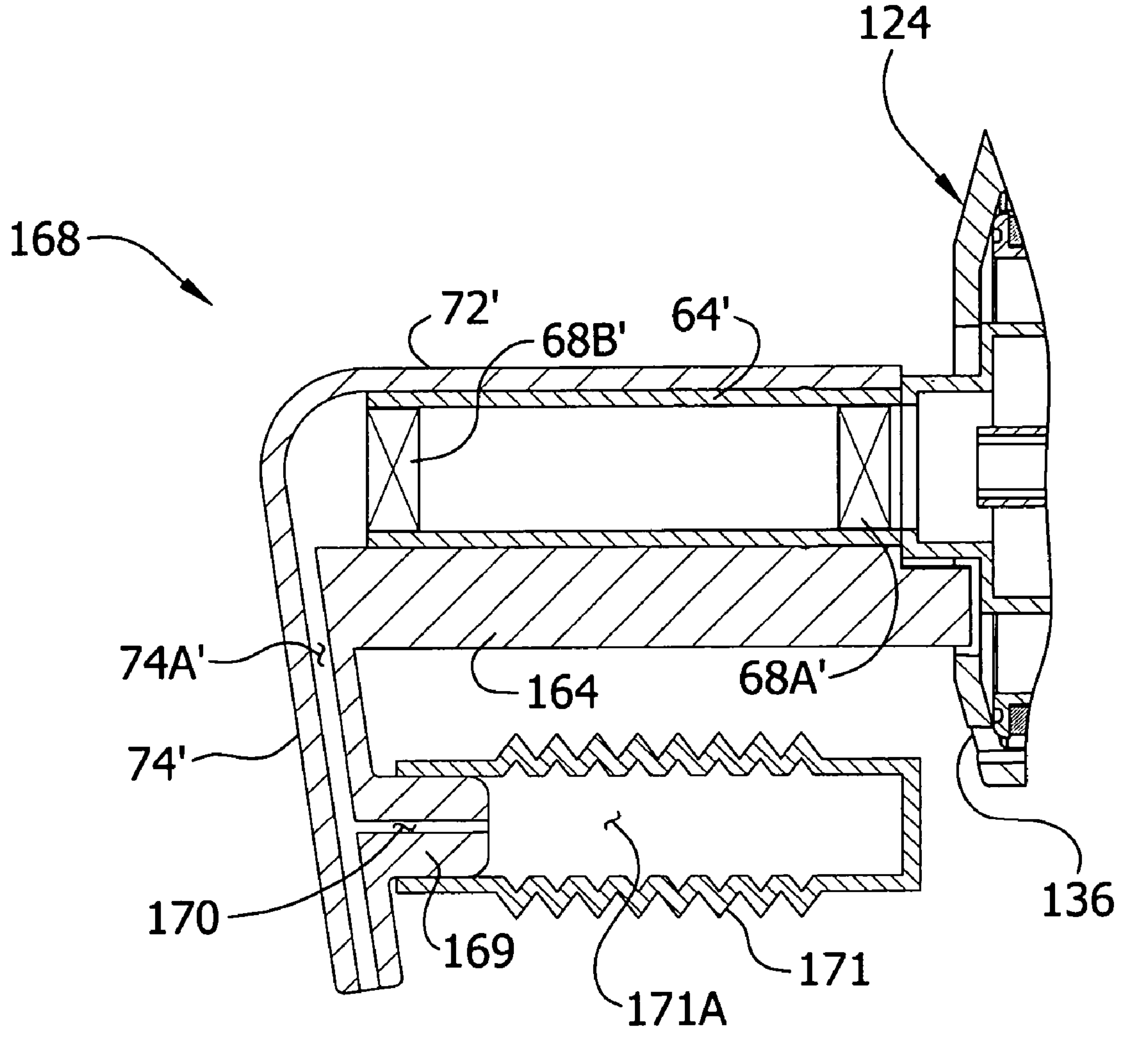
FIG. 10B is a longitudinal section of the head and fragmentary portion of the foaming pump with a bellows pump of the head in an extended position.
Figure 10C:
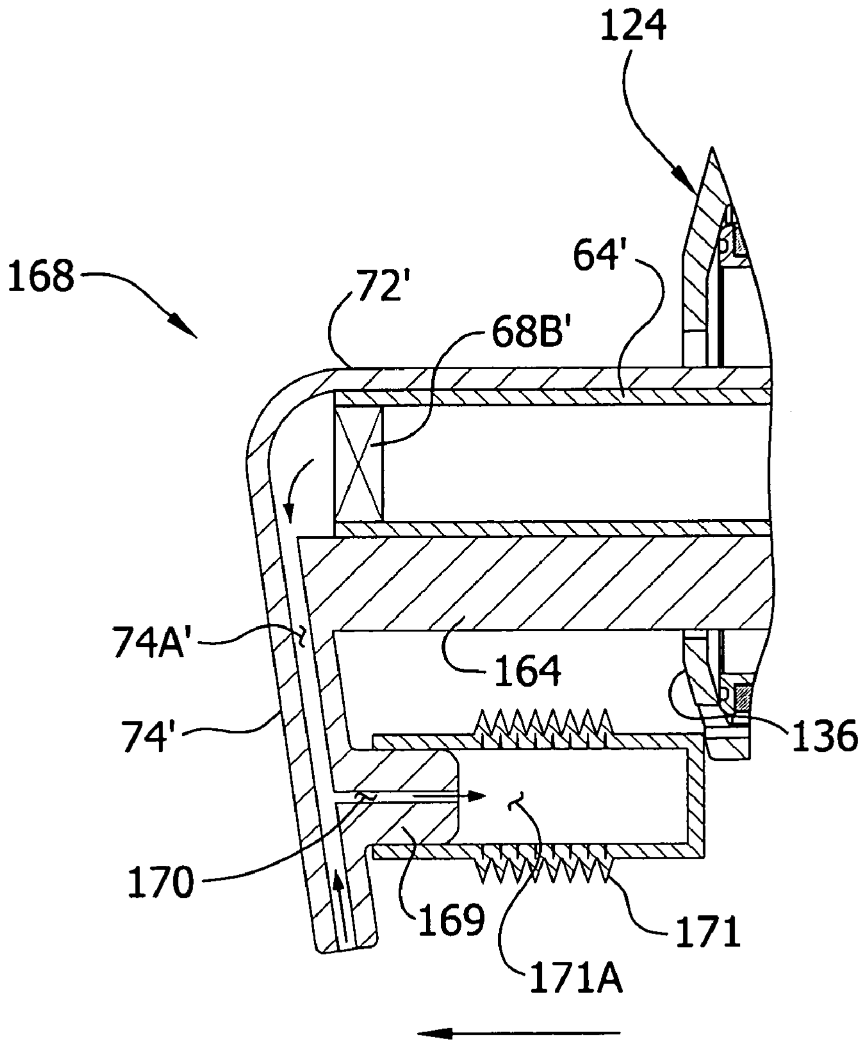
FIG. 10C is the section of FIG. 10B with the bellows pump in a contracted position.

Referring to FIGS. 10A-10C, another embodiment of the head, generally indicated at 168, is similar to the head 70, and as such corresponding components will have the same reference numbers with the addition of a trailing prime. The head 168 includes a connector 169 extending rearward from a rear surface of the exit portion 74' of the head. The connector 169 has a through-hole 170 extending into the internal passageway 74A' of exit portion 74' of the head 168. A bellows pump 171 (broadly, "a drip guard") mounted on the connector 169 extends rearward so that a free end of the bellows pump 171 is adjacent a lower portion of the faceplate 136 of the second clamping ring 124 when the head 168 is mounted on the pump 14. The bellows pump 171 includes an internal chamber 171A in fluid communication with the internal passageway 74A' of the exit portion 74' via the through-hole 170.

In use, as the head 168 is forced rearward, the bellows pump 171 contacts the faceplate 134 of the second clamping ring 124 and contracts to expel air (and any residual soap) within the chamber 171A into the internal passageway 74A' and out of the head with the foamed soap. When the force is removed from the head 168 allowing the head move forward, the bellows pump 171 expands, thereby creating a vacuum within the chamber 171A that draws foamed soap within the internal passageway 74A of the head into the chamber. Thus, between dispensing operation of the pump 14, excess foamed soap is removed from the internal passageway 74A so that the excess foamed soap does not drip out of the head. Moreover, a portion of the foamed soap expelled from head 168 may be clinging to an exterior surface of the head adjacent the exit of the internal passageway 74A'. The bellows pump 171 also draws this clinging foamed soap back into the internal passageway 74A' and into the chamber 171A. It is understood that a cylinder bulb or piston pump or other device for removing excess foamed soap from the internal passageway 74A may be used in lieu of the bellows pump 171.

Figure 10D:
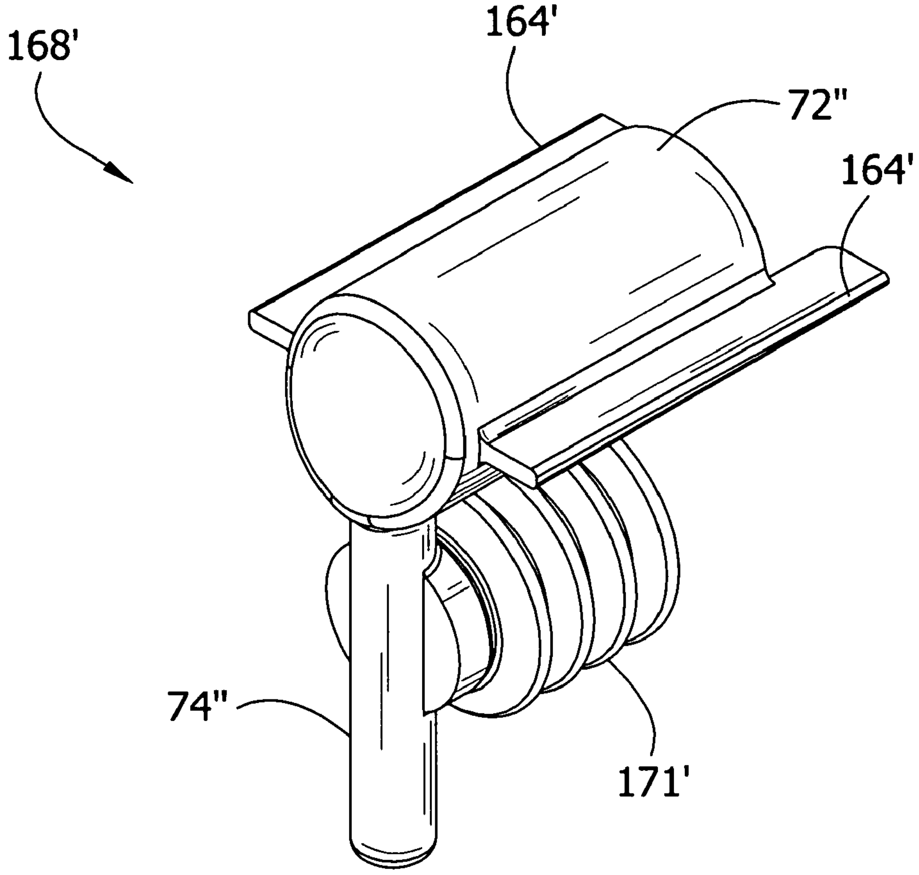
FIG. 10D is a perspective of a yet another embodiment of a head for the foaming pump.

Referring to FIG. 10D, yet another embodiment of a pump head, generally indicated at 168', is similar to the pump head 168, and as such corresponding components will have the same reference numbers with the addition of a trailing prime. A difference between the present pump head 168' and the other pump head 168 is that the present pump head has two locating ribs 164' extending laterally from opposite sides of the first tubular section 72" instead of a single locating rib (164 of the previous embodiments) projecting downward from the tubular first portion of the head. Another difference is that the exit portion 74" of the present head 168' has a more cylindrical shape. Although not described herein, the pump head 168' has other features that are similar to the previous pump head 168. Moreover, the pump head 168' may be used in the same manner and with the same components of the soap dispensing assembly as the previous pump head 168.

Figure 10E:
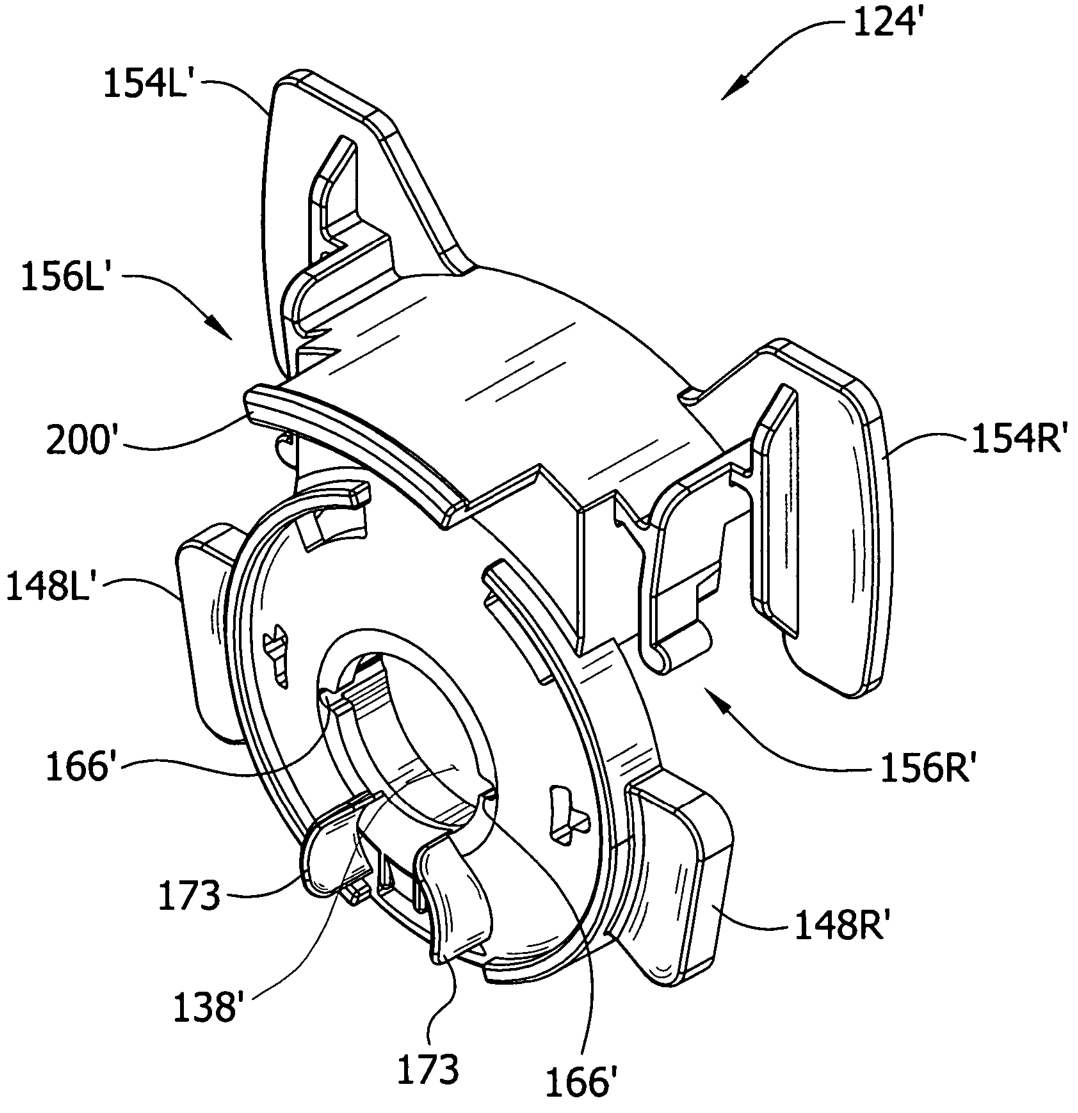
FIG. 10E is an enlarged front perspective of another embodiment of a first clamping ring.
Figure 10F:
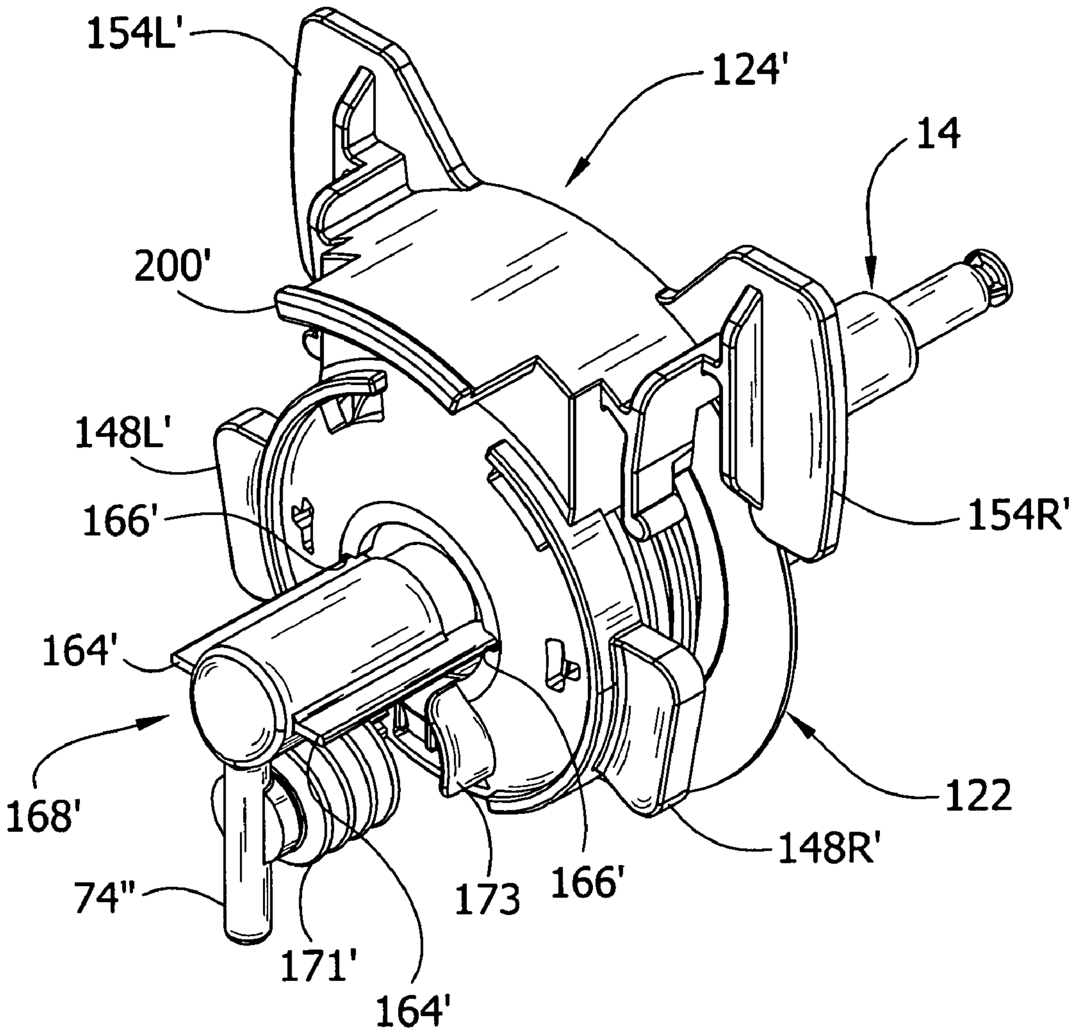

Referring to FIGS. 10E and 10F, another embodiment of a first clamping ring, generally indicated at 124', is similar to the first clamping ring 124, and as such corresponding components will have the same reference numbers with the addition of a trailing prime. The first clamping ring 124' has opposing notches 166' disposed laterally of the central opening 138' and in contiguous relationship therewith for receiving the locating ribs 164' of the pump head 168' (FIG. 10D). As with the locating rib 164 and the notch 166 of the previous embodiment, the locating ribs 164' and the notches 166' ensures that the exit portion 74' of the head 168' is properly oriented and will be pointing downward when the container 12 is received in the dispenser 18. In other words, the locating ribs 166' prevent rotation of the pump head 164'.

The first clamping ring 124' also includes opposing arcuate projections 173 extending forward from the first clamping ring below the central opening 138'. The projections 173 are located on the first clamping ring 124' so that as the bellows pump 171' contacts the first clamping ring, it is trapped between the projections 173 to prevent the pump from moving or sliding laterally on the first clamping ring, which could prevent full axial contraction of the pump. Although not described herein, the first clamping ring 124' has other features that are similar to the previous clamping ring 124. Moreover, the first clamping ring 124' may be used in the same manner and with the same components of the soap dispensing assembly as the previous first clamping ring 124.

The soap container 12 allows for a manufacturer to produce a large quantity of one type of bag 13 and a large quantity of one type of pump mount 16 for both a container that dispenses liquid soap and a container that dispenses foamed soap. During the assembling process, the liquid pump 86 may be mounted on a selected number of containers 12 and a foaming pump 14 may be mounted on another selected number of the containers.

Referring to FIG. 11-15, the dispenser 18 includes a rear wall mount 172 (FIG. 11) for securing the dispenser to a wall (not shown), such as a restroom wall, or other structure. The wall mount 172 is generally planar having front and rear faces. Mounting holes 174 are formed in the wall mount 172 for inserting screws or other types of fasteners to secure the wall mount to the wall or other structure so that the rear face of the wall mount is generally flush with the wall and the front face faces away from the wall.

A pocket 176 (FIG. 11) for receiving the bag 13 of the soap container 12 is defined by a platform 178 projecting forward from a lower portion of the wall mount 172, a pair of opposing side walls 180L, 180R projecting forward from opposite sides of the wall mount, and a front wall 182 extending between the side walls in opposing relationship with the rear wall mount. The front wall 182 has a generally U-shaped opening 184 for receiving the pump mount 16 of the container 12. The U-shaped opening 184 is defined by an arcuate bottom edge 186 and opposite linear side edges 188L, 188R (FIGS. 11 and 12) extending upward from the arcuate bottom edge. Upper edges of the front wall extend from the side edges 188L, 188R defining the U-shaped opening 184 and diverge to respective opposing side walls 180R, 180L of the dispenser 18.

Figure 11:
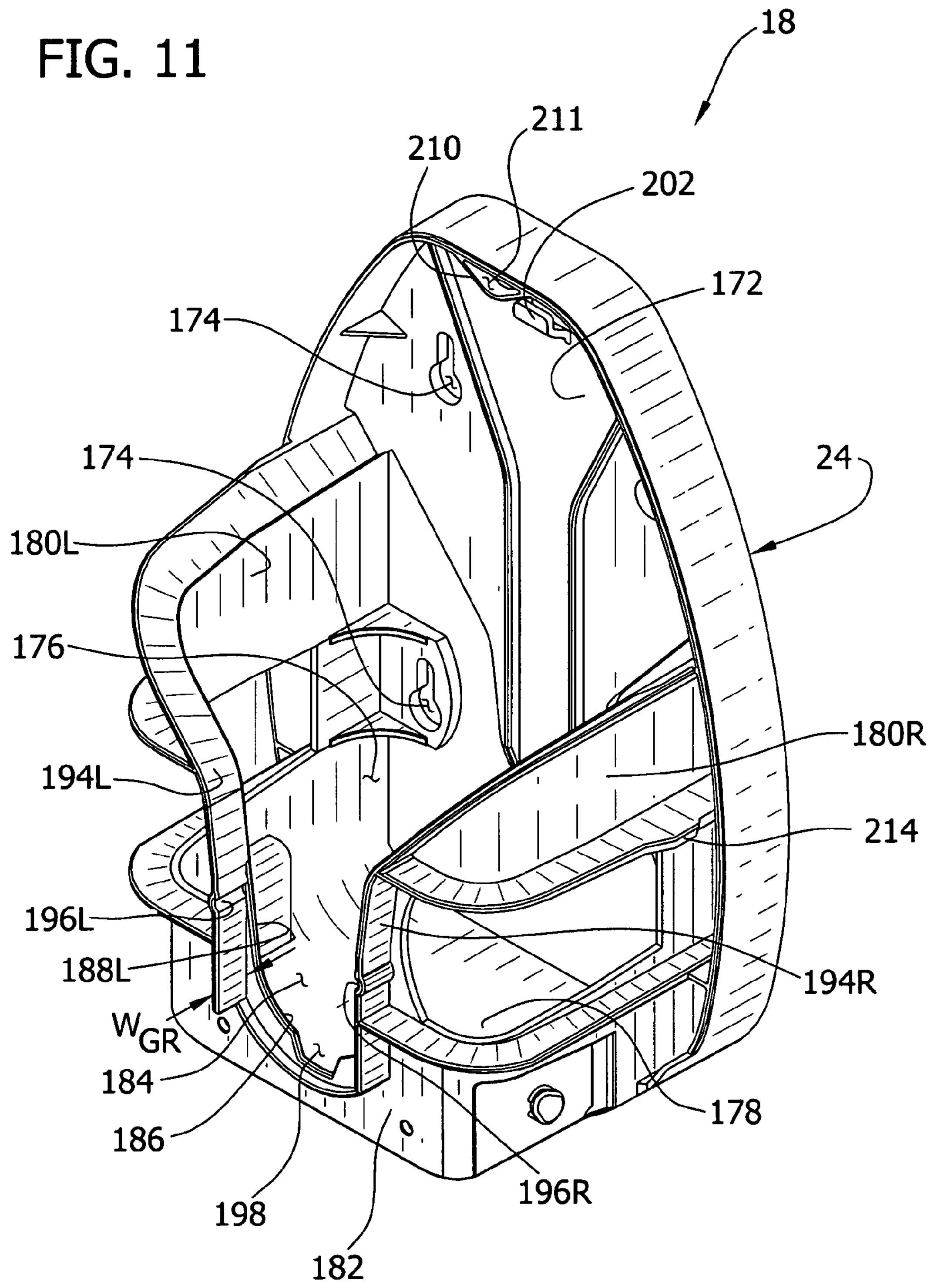
FIG. 11 is a perspective of the dispenser with a cover thereof removed.
Figure 12:
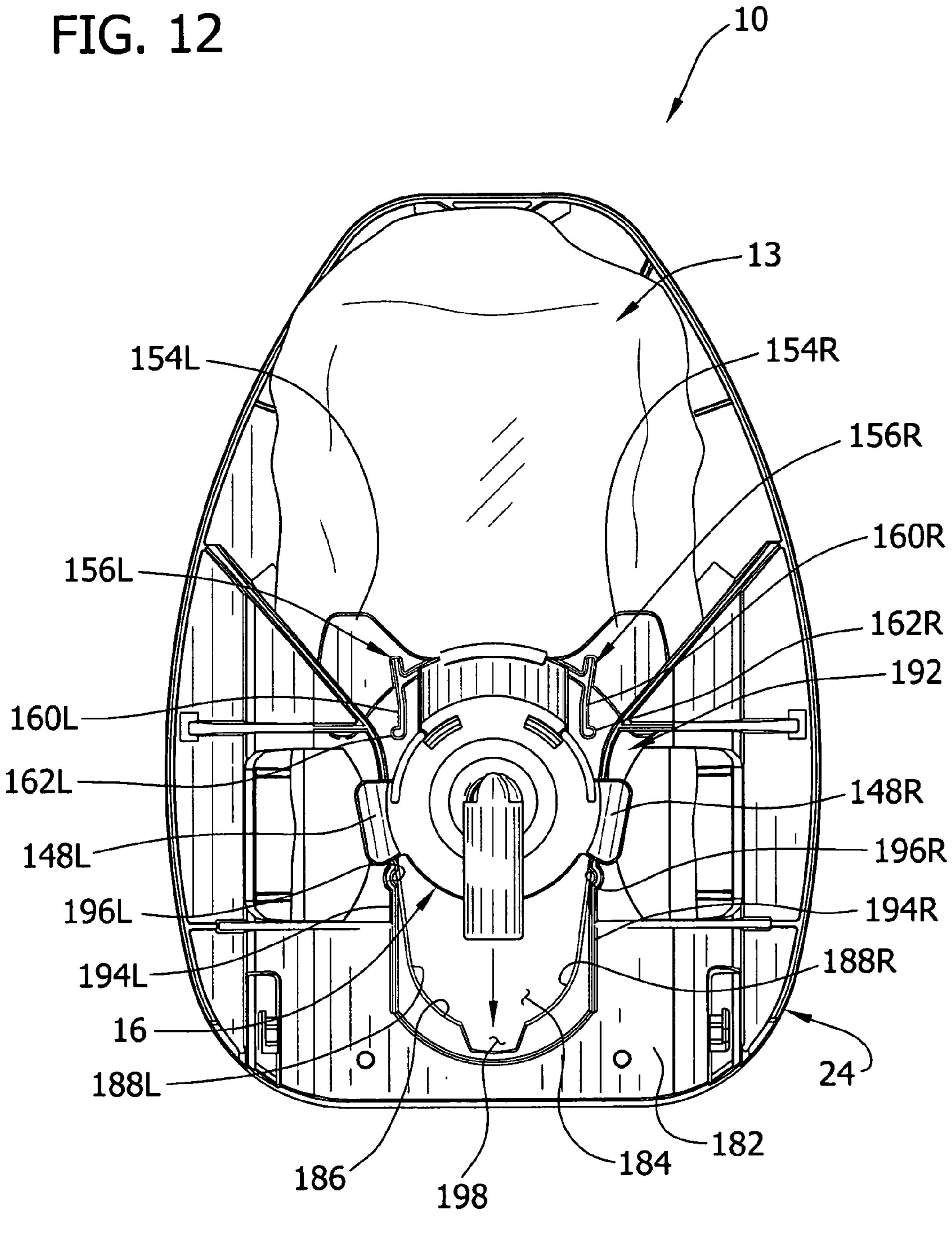
FIG. 12 is a front elevation of the dispenser with the soap container being placed therein.

The pump holder 24 of the dispenser 18 releasably mounts the pump 14 in the U-shaped opening 184. The pump holder 24 includes a pair of spaced apart, opposing guide rails 194L, 194R. The guide rails extend vertically adjacent the side edges 188L, 188R, respectively, defining the U-shaped opening 184 and along the beveled upper edges of the front wall 182 (FIG. 12). The guide rails 194L, 194R have a width $W_{GR}$ (FIG. 11) projecting forward from the front wall 182. The rails 194L, 194R may also extend along upper edges of the opposing side walls 180L, 180R, respectively, to the rear wall mount 172.

Figure 13:
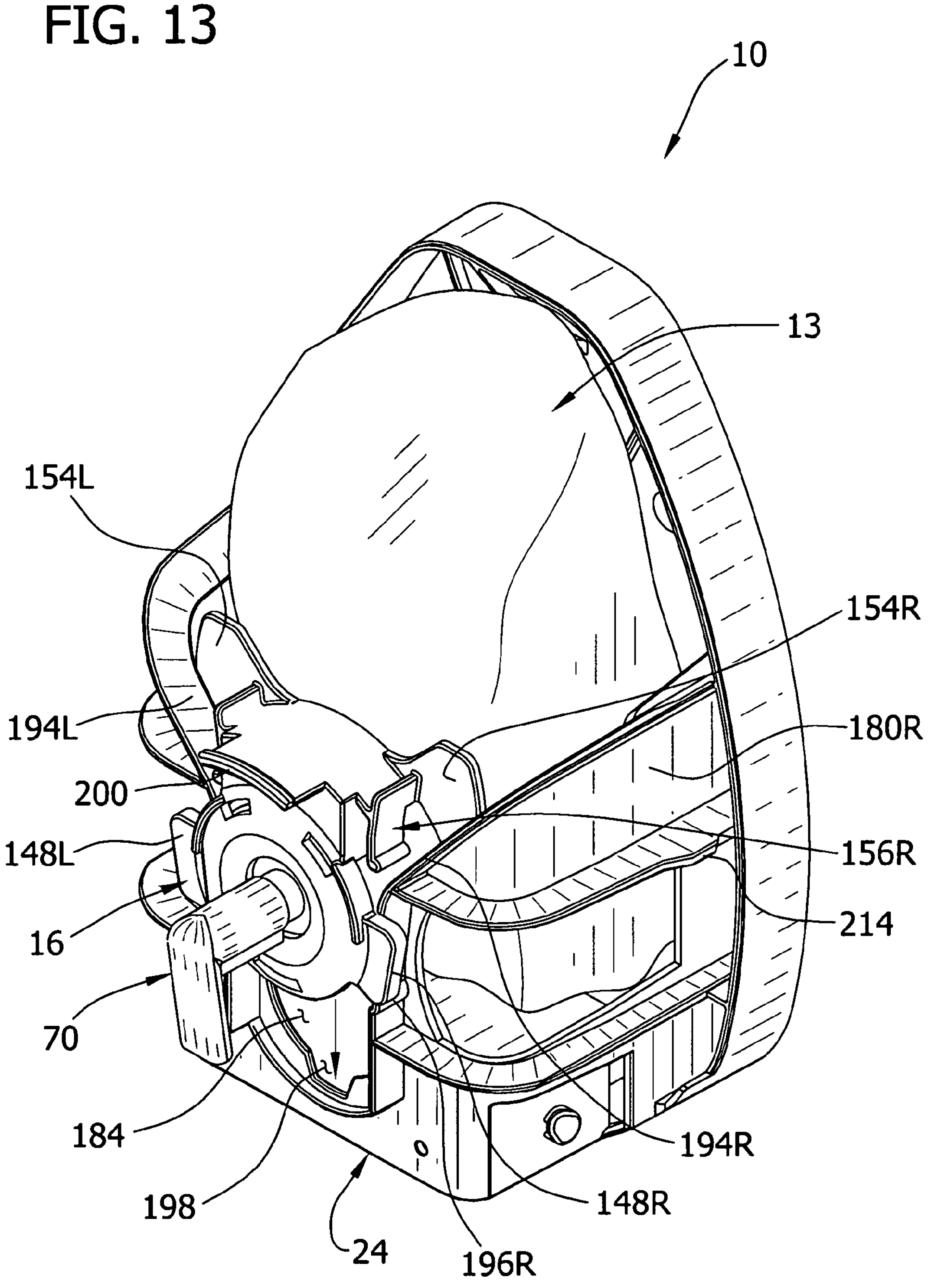
FIG. 13 is a perspective of FIG. 12.

The guide rails 194L, 194R are configured to slidably receive the pump mount 16 of the container 12, regardless of whether the liquid pump 86 or the foaming pump 14 is attached to the container. FIGS. 12-18A illustrate the container 12 having a foaming pump 14, but it is understood that the constructions and methods are the same if the container 12 had a liquid pump 86. The width $W_{GR}$ of the guide rails 194L, 194R should be slightly smaller than the width $W_C$ of the channels C defined by the corresponding front and rear tabs 148L, 148R and 154L, 154R, respectively, of the second clamping ring 124 so that the guide rails can be received in the grooves and the pump mount 16 can slide downward on the rails into the U-shaped opening 184. Thus, when the pump mount 16 is received on the rails 194L, 194R, the front tabs 148L, 148R of the first clamping ring 122 are in front of the rails and the rear tabs 154L, 154R are behind the rails (FIGS. 12 and 13).

Figure 14:
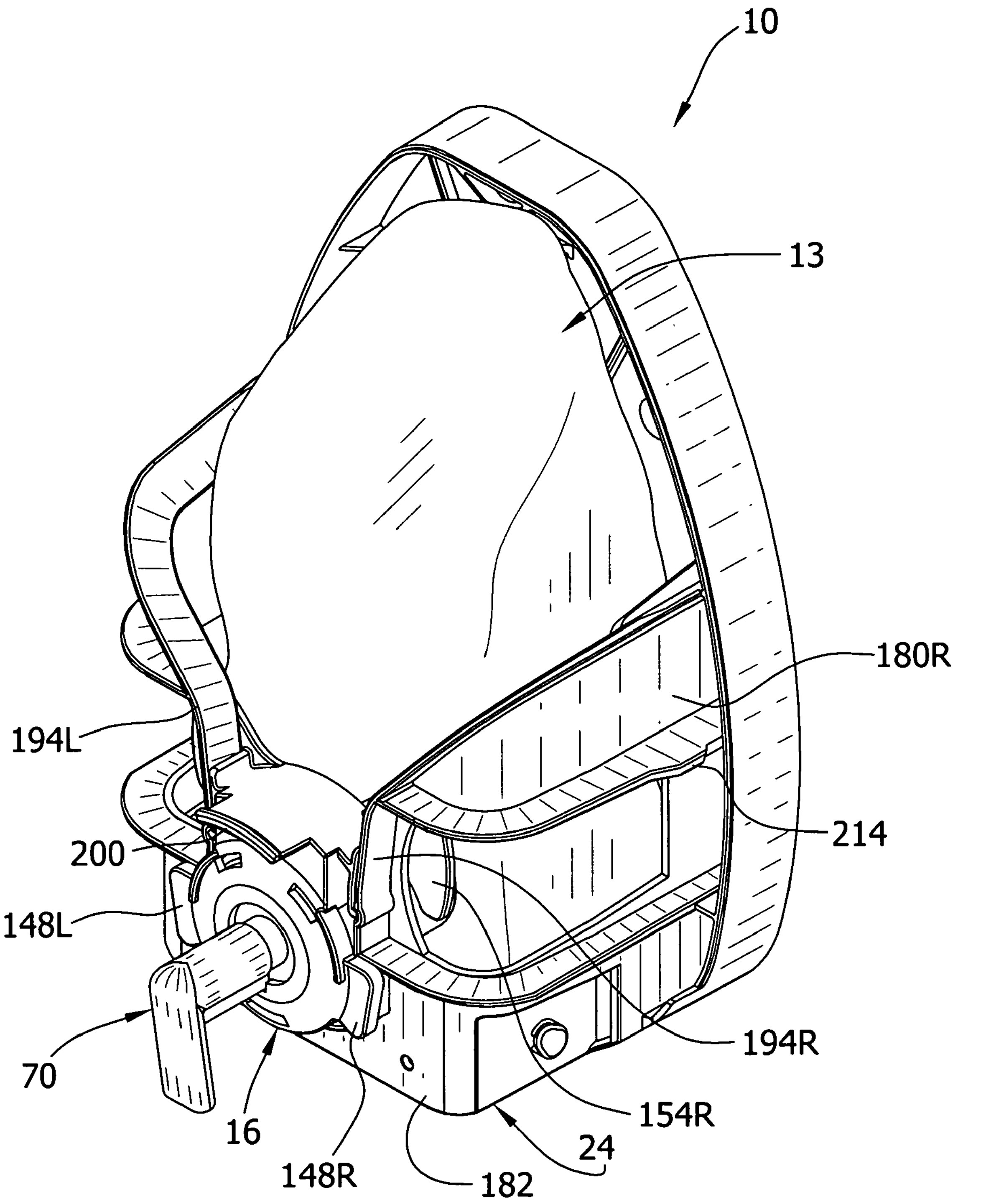
FIG. 14 is a perspective of the soap container received in the dispenser.
Figure 15:
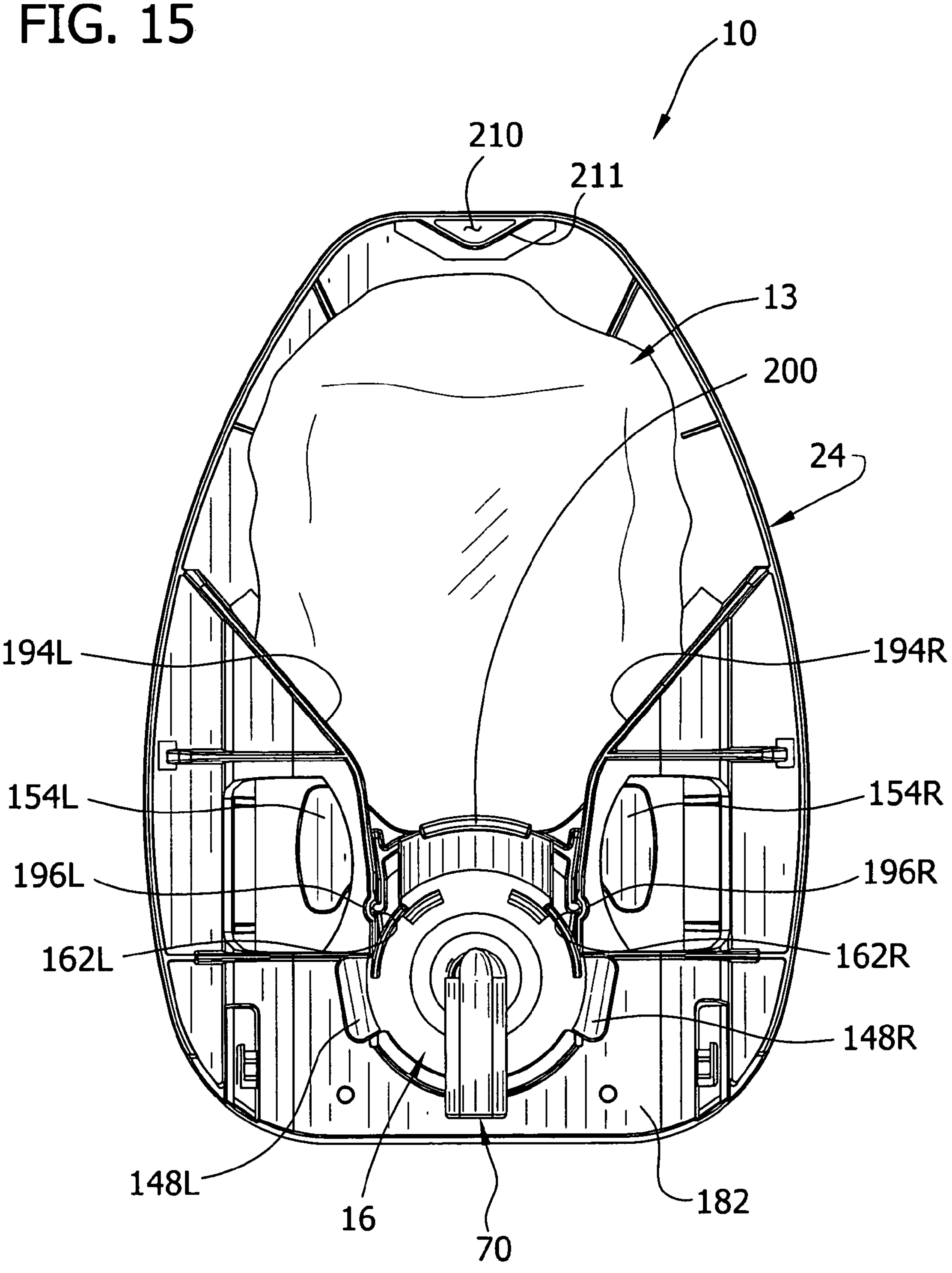
FIG. 15 is a front elevation of FIG. 14.
Figure 16:
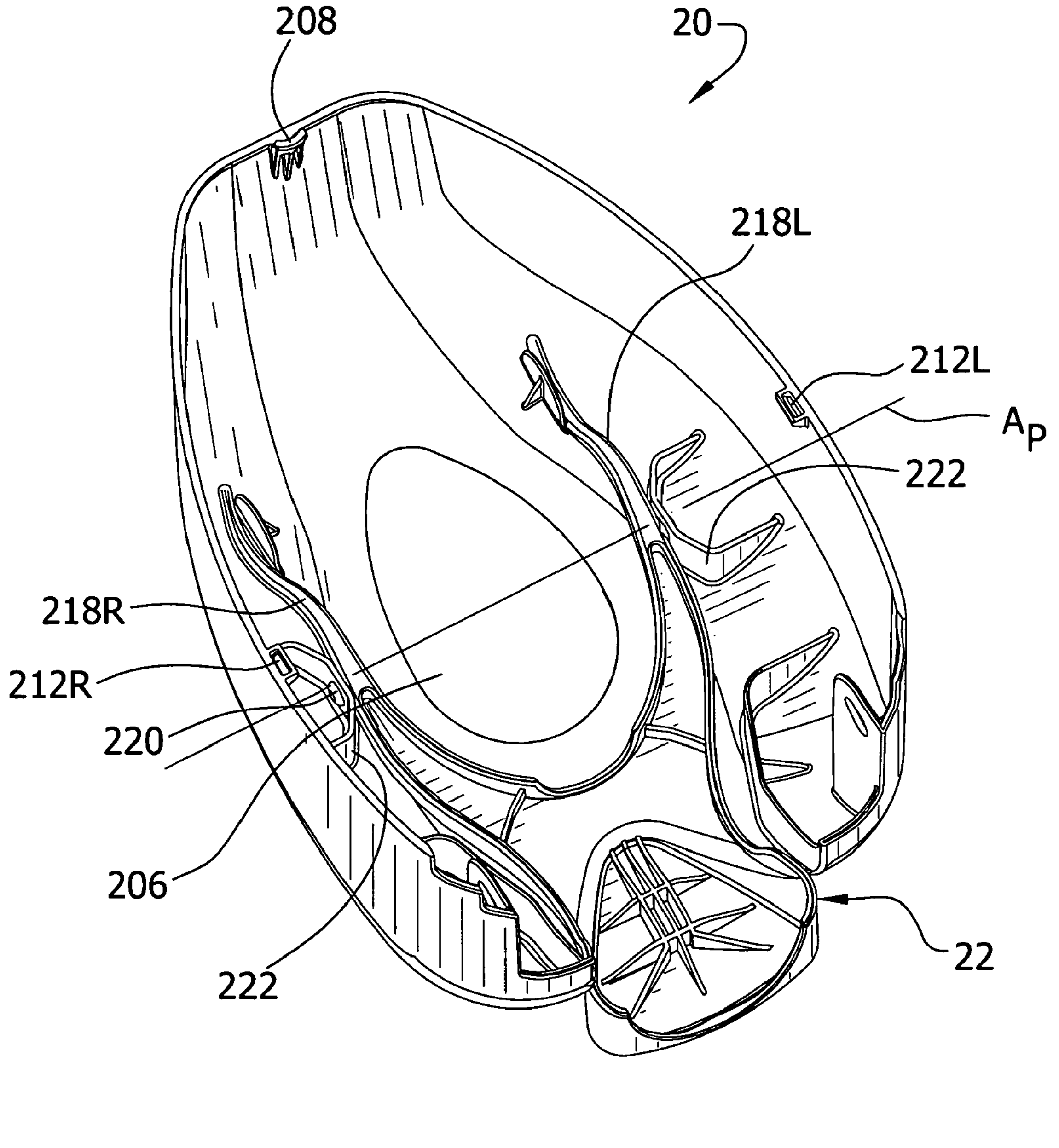
FIG. 16 is a back side perspective of a cover of the dispenser.

The pump holder 192 is configured to releasably secure the pump mount 16 of the container 12 in the U-shaped opening 184 using the snap-fit components 156L, 156R of the second clamping ring 124. The distance between the opposing guide rails 194L, 194R in the U-shaped mount opening 184 should be slightly smaller than spacing between the snap-fit projections 162L, 162R such that as the pump mount 16 slides downward on the guide rails, the arms 160L, 160R of the snap-fit component, including the snap-fit projections, are gradually pushed inward, toward the upper projection 150 of the second clamping ring 124. As the pump mount 16 becomes fully received in the U-shaped mount opening 184, the arms 160L, 160R of the snap-fit components 154L, 154R, respectively, enter opposing recesses 196L, 196R extending along the width $W_{GR}$ of the guide rails 194L, 194R. The snap-fit projections 162L, 162L resiliently move outward toward their original positions as they enter the recesses 196L, 196R. Referring to FIGS. 14 and 15, when the snap-fit projections 162L, 162R are received in the recesses 196L, 196R, the pump mount 16 is in proper position and the container 12 is temporarily retained in a locked position in the dispenser 18. Other ways of temporarily retaining the pump mount 16 and the container 12 is proper position in the dispenser is within the scope of this invention. It is also envisioned that no retaining structure may be used.

The front wall 182 includes a notch 198 (FIG. 11-13) extending from the arcuate bottom edge 186 defining the U-shaped opening 184 for receiving the lower snap-fit arm 140L of the second clamping member 124. When the pump mount 16 is completely received in the U-shaped opening 184, the lower snap-fit arm 140L is received in the notch 198 and the arcuate bottom edge 186 is received in the groove 133 of the first clamping ring 122. This configuration further retains the pump mount 16 in position in the U-shaped mount opening 184.

The second clamping ring 124 also includes a handle extension 200 projecting forward from the upper extension 150. The handle extension 200 may be grasped by a user to guide the pump mount 16 into position along the guide rails 194L, 194R and to force the pump mount downward into its locked position. The handle 200 may also be used to remove the container 12 from the dispenser 18 (i.e., move the dispenser upward), so that a new container may be inserted in its place.

As shown in FIGS. 12 and 13, to mount the container 12 in the dispenser 18, the pump mount 16 is received on the guide rails 194L, 194R at the upper edges of the front wall 182 so that the guide rails are received in the channels C defined by the respective front and rear tabs 148L, 154R and 148R, 154R. Using the handle extension 200, the pump mount 16 along with the container 12 is forced downward, along the guide rails 194L, 194R. As the pump mount 16 travels downward along the guide rails 194L, 194R at the beveled upper edges of the front wall 182, the pump mount is forced (i.e., rotates, if necessary) into its proper position by the guide rails, thereby ensuring that the exit portion 74 of the pump head 70 is pointing downward. As the pump mount 16 enters the U-shaped mount opening 184, the arms 160 of the second clamping ring 124 are pushed inward, toward the top extension 150 by the guide rails 194L, 194R. The pump mount 16 continues along the guide rails 194L, 194R and into the U-shaped mount opening 184 until the snap-fit projections 162L, 162R are received in the recesses 196L, 196R of the rails, at which time the container 12 is temporarily in its locked position. To dismount the container 12, the pump mount 16 is forced upward, using the handle projection 200. The force elastically deforms the arms 160L, 160R of the snap-fit components 156L, 156R, pushing them inward to allow the snap-fit projections 162L, 162R slide out of the respective recesses 196L, 196R and allow the pump mount 16 to slide upward along the guide rails 194L, 194R.

In one embodiment, the dispenser 18 includes a hanger 202 (FIGS. 11 and 18A) projecting forward from the front face of the wall mount 172. The bag 13 of the container 12 includes a loop component 204 (FIG. 18A) at an upper portion of the bag for being received on the hanger 202. Hanging the bag 12 on the hanger 202 keeps the bag upright during use and prevents the bag from collapsing on itself as the soap is removed from the bag.

Figure 17:
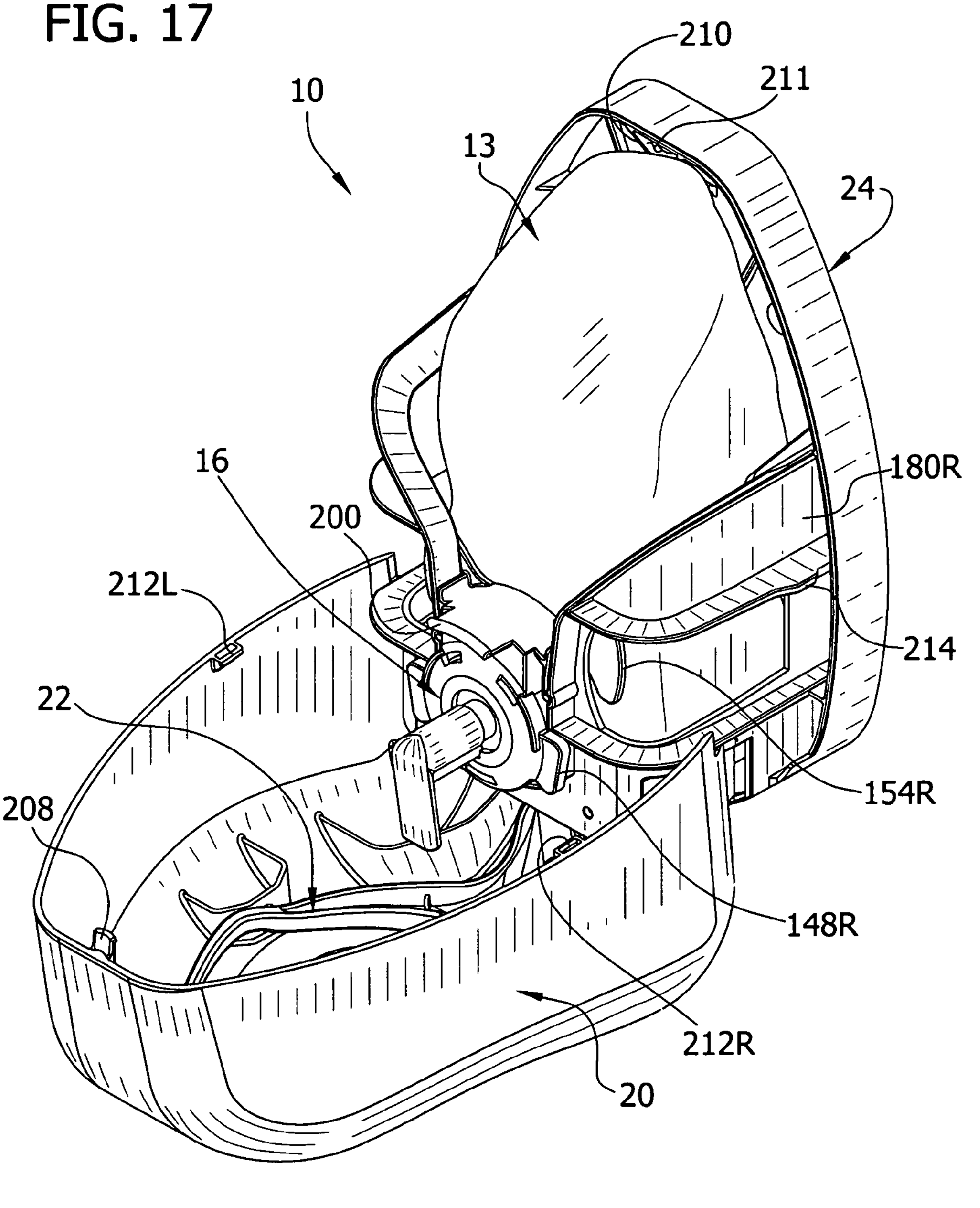
FIG. 17 is a perspective of the dispenser having the cover with an actuator attached thereto.
Figure 18:
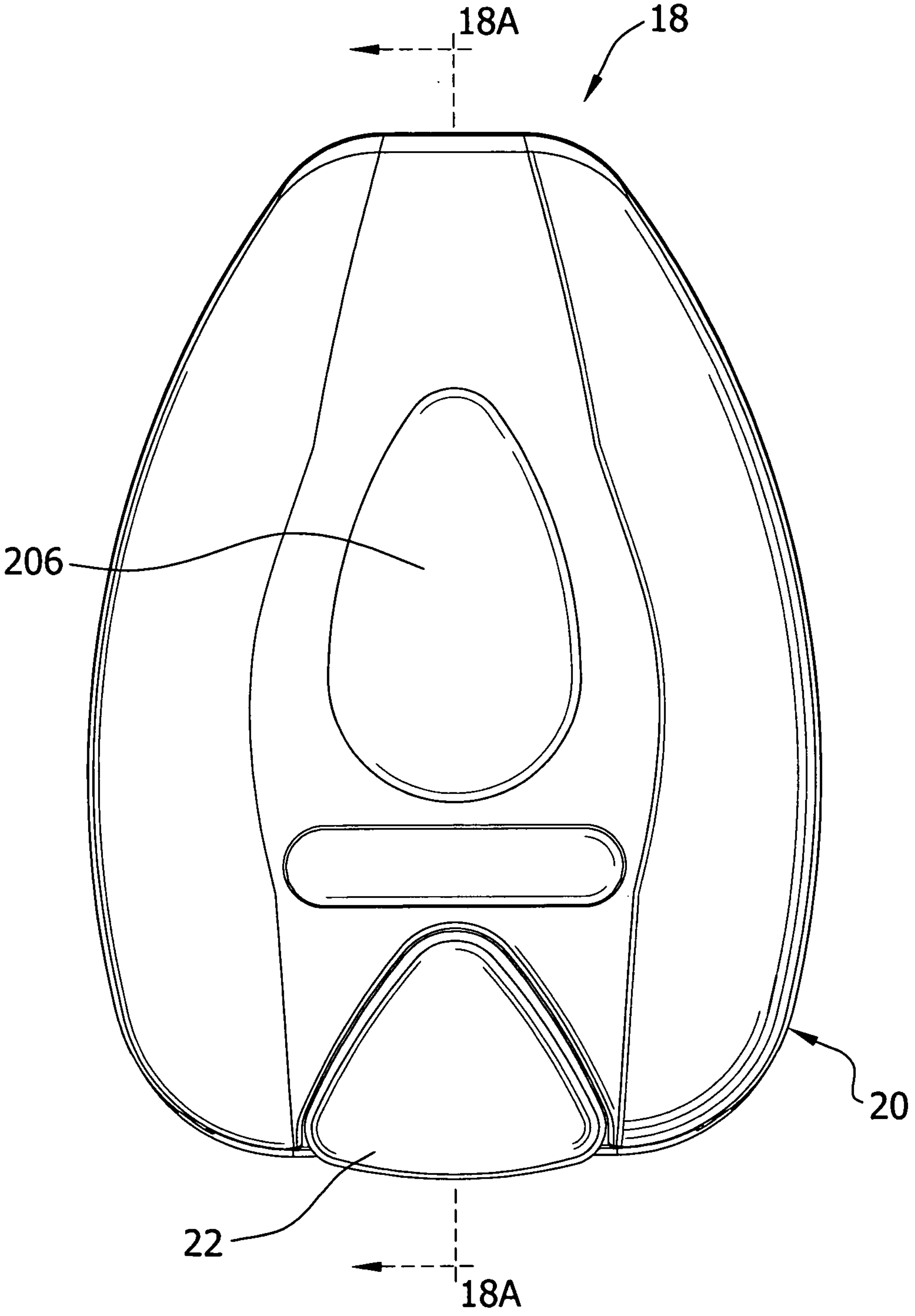
FIG. 18 is a perspective of the dispenser with the cover closed.
Figure 18A:
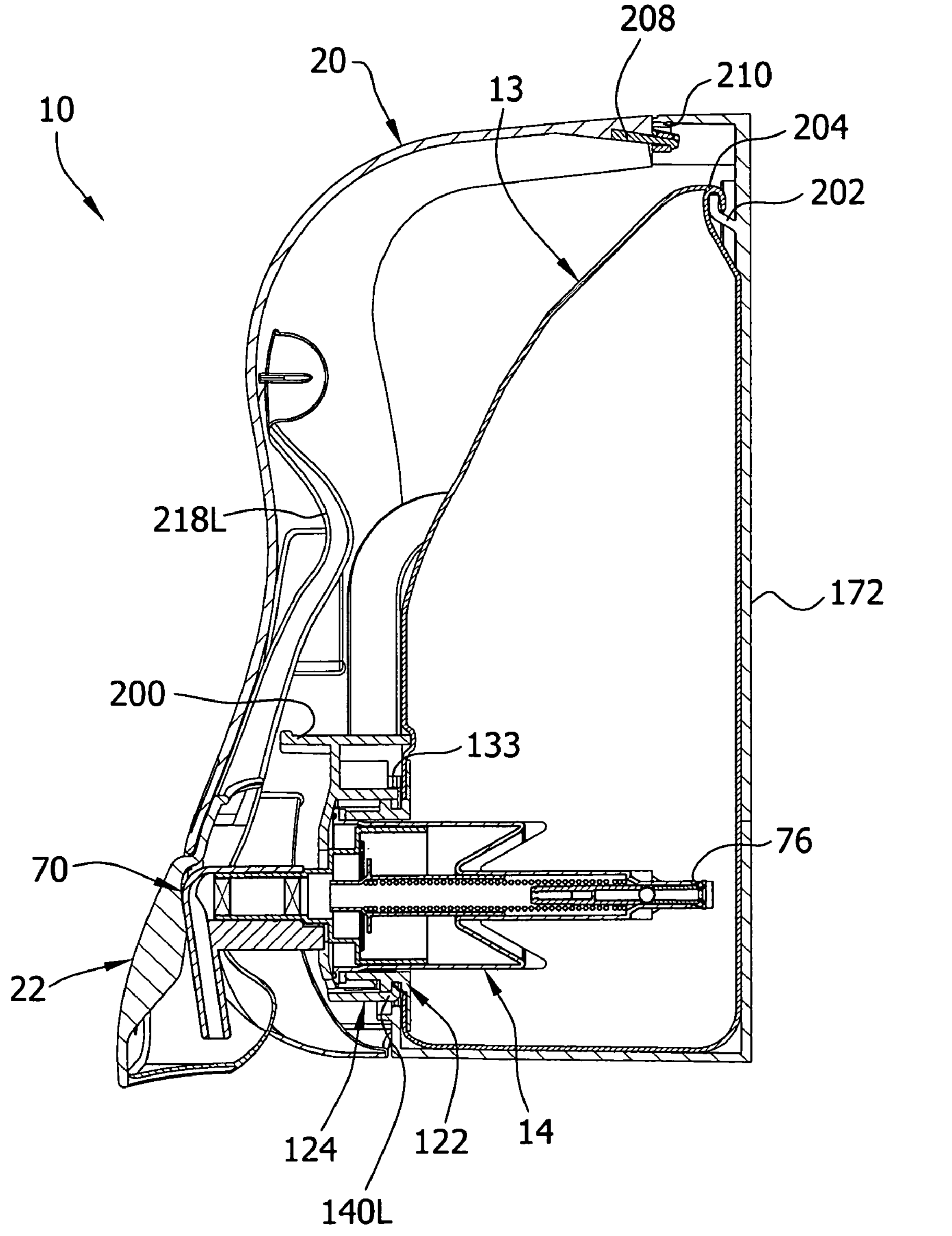
FIG. 18A is a section of the dispenser of FIG. 18 taken in the plane including the line 18A-18A.

Referring to FIGS. 17 and 18, the cover 20 of the dispenser 18 is pivotally secured to lower portions of the side walls 180L, 180R of the dispenser. The cover 20 conceals the container 12, including the pump 14 and the head 70 when it is closed. The cover 20 includes a window 206 for observing the bag 13 inside the dispenser 18 to determine the amount of soap remaining in the bag. A top latch 208 projects rearward from a top portion of the cover 20 to be removably inserted into a corresponding top keeper 210 formed in the upper portion of the wall mount 172 for locking the cover in a closed position. The top latch 208 includes a hook and the keeper 210 includes an opening 211 (FIGS. 11 and 15). As the cover 20 is being closed, the latch 208 passes through the opening 211 of the keeper 210 and the hook catches on a rear edge margin of the keeper defining the opening. To release the latch 208 from the keeper 210, the user may push down on a top surface of the rear wall mount 172 to elastically move the rear edge margin of the keeper below the hook. The cover 20 may then be pivoted rearward as the hook retracts back through the opening 211. A pair of opposite side latches 212L, 212R (FIG. 16) project inward from sides of the cover 20. A pair of corresponding retainers 214 (only the right retainer is shown in FIGS. 11, 13, 14 and 17) project laterally from the side walls 180L, 180R to define a groove. As the cover 20 is being closed, the side latches 212L, 212R slide over the retainers 214 into the grooves and catch on the retainers 214. The side latches 212L, 212R act as a back-up to the top latch 208 connection. Other ways of locking the cover 20 in a closed position is within the scope of this invention.

Referring to FIGS. 16-18A, the actuator 22 is pivotally secured to an interior of the cover 20 of the dispenser 18 and is movable between a forward and a rearward position. The actuator 22 is aligned with the head 70 of the pump 14 when the cover 20 is closed (FIG. 18A) such that as the actuator is pivoted to its rearward position, it contacts the head and forces rearward movement of the pistons 42, 30 in the respective cylinders 44, 32 of the pump 14. Repeated movement of the actuator 222 produces pumping action of the pistons 42, 30, which, as is explained above, delivers the foamed soap out the exit portion 74 of the head 70. It is understood that the actuator 22 would operate the liquid pump 86 in the same way.

The actuator 22 is biased in its forward position by a pair of spring arms 218. Each spring arm 218 includes a first connecting element 220 (e.g., a pin) for pivotal connection to a second connecting 222 element of the cover 20 (e.g., corresponding slot). The actuator 22 pivots about a pivotal axis $A_P$. Portions of the spring arms 220 disposed above the pivot axis $A_P$ are elastically deformable and act to bias the actuator 22 toward its forward position, thereby making the actuator automatically retractable to its original, forward position. This construction allows the piston(s) of the corresponding pump 14, 86 to return to its extended position without having to also retract the actuator 22.

In use, the universal dispenser 18 is mounted on a structure, such as a wall of a restroom. The cover 20 of the dispenser 18 is opened and a first soap container 12 is inserted into the dispenser. The first soap container 12 may have either a liquid pump 86 or a foaming pump 14 attached thereto using the pump mount 16, as described above. The user can use one hand to grab the handle 200 of the pump mount 16 and another hand to hold the top of the bag 12 of the container 12. The user slides the pump mount 16 along the guide rails 194L, 194R of the dispenser 18 to mount the container in the dispenser. The user can also hang the bag 13 on the hanger 202 of the dispenser 18 user the loop 204 on the bag. Once the bag 13 is secure in the dispenser 18, the user closes the cover 20, and the apparatus 10 is operable.

When the bag 13 of the first soap container 12 is empty or if the user wants to switch the type of soap being used, the user opens the cover 20 and removes the first soap container from the dispenser by pulling upward on the handle 200 of the pump mount 16. After the pump mount 16 is removed from pump holder 192, the bag 13 may be completely removed from the dispenser 18. A second container 12 is inserted into the dispenser 18 in the same way as the first container.

The interchangeability and interoperability of the soap containers 12 in the dispenser 18 is an efficient and cost-effective way of manufacturing soap dispenser and containers. The containers 12 and soap dispenser 18 allow the manufacturer to sell one universal dispenser (and the consumer to buy one dispenser) and allow the consumer to choose between using foamed soap and liquid soap. Moreover, typically the consumer installs more than one dispenser 18 per restroom. The consumer can buy a plurality of the same type of dispenser 18 and can use some of the dispensers for dispensing foamed soap and the other dispensers for dispensing liquid soap. Moreover still, if the consumer decides to switch soap (e.g., switch from liquid to foamed soap), the consumer does not have to buy and install a new dispenser. Instead, the consumer only needs to buy a container 12 with the other type of pump (e.g., a foaming pump 14 and foaming soap).

The soap dispensing assembly 10 may be sold as a kit, whereby the consumer receives the dispenser 18, a container 12 configured for dispensing liquid soap, and a container configured for dispensing foamed soap.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A pump head for use in dispensing soap while inhibiting dripping of soap, the pump head comprising:

a body having a first portion with front and rear ends, a second portion extending generally downward adjacent the front end of the first portion, an internal passageway extending from the first portion through the second portion for transporting the soap through the body, wherein the first portion defines an inlet of the internal passageway for receiving soap and the second portion defines an outlet of the internal passageway for dispensing soap, and a through hole located away from the first portion and extending through the second portion and intersecting the internal passageway in the second portion of the body at an angle to the internal passageway, and a drip guard member extending outward from the second portion of the body below and generally parallel to the first portion of the body and in fluid communication with the internal passageway by way of the through hole in the second portion of the body, the drip guard member being constructed to apply a vacuum to the internal passageway following dispensing of the soap to draw any residual soap in the internal passageway out of the internal passageway to inhibit dripping.

2. A pump head as set forth in claim 1 wherein the drip guard member comprises a resiliently collapsible pump defining an internal chamber in fluid communication with the internal passageway for receiving said residual soap in the internal passageway.

3. A pump head as set forth in claim 2 wherein the pump has an imaginary axis extending outward from the body, the pump being resiliently collapsible along said imaginary axis.

4. A pump head as set forth in claim 3 wherein the resiliently collapsible pump is a bellows pump attached to the body.

5. A pump head as set forth in claim 4 wherein the body has a connector on which the bellows pump is attached, the connector defining the through-hole fluidly connecting the internal passageway of the body to the internal chamber of the bellows pump.

6. A pump head as set forth in claim 5 wherein the connector extends rearward from the second portion of the body proximate to the outlet.

7. A pump head as set forth in claim 1 wherein the first portion of the body defines an opening for receiving an outlet portion of a soap pump.

8. A pump head as set forth in claim 7 wherein the drip guard comprises a bellows pump extending rearward from the second portion, generally parallel to the first portion.

9. A foaming pump for dispensing foamed soap from a container of soap, the foaming pump comprising:

a cylinder;

a piston secured to the cylinder and adapted to slidably reciprocate rearward and forward relative to the cylinder along an axis, the piston having a forward outlet portion;

a foaming mechanism for producing foamed soap that exits the outlet portion of the piston when the piston is slidably moved rearward relative to the cylinder; and a pump head in fluid communication with the outlet portion of the piston, the pump head comprising:

a body having a first portion with front and rear ends, a second portion extending generally downward adjacent the front end of the first portion, and an internal passageway extending from the first portion through the second portion for transporting the foamed soap through the body, wherein the first portion defines an inlet of the internal passageway for receiving soap and the second portion defines an outlet of the internal passageway for dispensing soap, wherein the first portion of the body is secured to the outlet portion of the piston, a through hole located away from the first portion and extending through the second portion and intersecting the internal passageway in the second portion of the body at an angle to the internal passageway, and a drip guard member extending outward from the second portion of the body below and generally parallel to the first portion of the body and in fluid communication with the internal passageway by way of the through hole in the second portion of the body, the drip guard member being constructed to apply a vacuum to the internal passageway following dispensing of the foamed soap to draw any residual soap in the internal passageway out of the internal passageway to inhibit dripping.

10. A foaming pump as set forth in claim 9 wherein the drip guard member comprises a resiliently collapsible drip pump defining an internal chamber in fluid communication with the internal passageway of the body of the pump head for receiving said residual soap in the internal passageway.

11. A foaming pump as set forth in claim 10 wherein the drip pump has an imaginary axis extending outward from the body of the pump head, the drip pump being resiliently collapsible along said imaginary axis.

12. A foaming pump as set forth in claim 11 wherein the imaginary axis of the drip pump extends rearward from the body of the pump head, generally parallel to the outlet portion of the piston.

13. A foaming pump as set forth in claim 12 wherein the resiliently collapsible pump is a bellows pump attached to the body.

14. A foaming pump as set forth in claim 10 in combination with a soap container defining an internal space for holding foamable soap, the foaming pump being secured to the container in fluid communication with the internal space.

15. A foaming pump in combination with a soap container as set forth in claim 14 in further combination with a pump mount securing the foaming pump to the soap container, wherein the drip pump contacts the pump mount to collapse the drip pump when the piston slides rearward relative to the cylinder, and wherein the drip pump expands and draws any residual soap in the internal passageway out of the internal passageway into the internal chamber of the drip pump when the piston slides forward relative to the cylinder.

16. A foaming pump for dispensing foamed soap from a container of soap, the foaming pump comprising:

a cylinder;

a piston secured to the cylinder and adapted to slidably reciprocate rearward and forward relative to the cylinder along an axis, the piston having a forward outlet portion;

a foaming mechanism for producing foamed soap that exits the outlet portion of the piston when the piston is slidably moved rearward relative to the cylinder; and a pump head in fluid communication with the outlet portion of the piston, the pump head comprising:

a body having a first portion with front and rear ends, a second portion extending generally downward adjacent the front end of the first portion, and an internal passageway extending from the first portion through the second portion for transporting the foamed soap through the body, wherein the first portion defines an inlet of the internal passageway for receiving soap and the second portion defines an outlet of the internal passageway for dispensing soap, wherein the first portion of the body is secured to the outlet portion of the piston; and a drip guard member extending outward from the second portion of the body below the first portion of the body and in fluid communication with the internal passageway, the drip guard member being constructed to apply a vacuum to the internal passageway following dispensing of the foamed soap to draw any residual soap in the internal passageway out of the internal passageway to inhibit dripping, wherein the drip guard member comprises a resiliently collapsible drip pump defining an internal chamber in fluid communication with the internal passageway of the body of the pump head for receiving said residual soap in the internal passageway;

in combination with a soap container defining an internal space for holding foamable soap, the foaming pump being secured to the container in fluid communication with the internal space, and in combination with a pump mount securing the foaming pump to the soap container, wherein the drip pump contacts the pump mount to collapse the drip pump when the piston slides rearward relative to the cylinder, and wherein the drip pump expands and draws any residual soap in the internal passageway out of the internal passageway into the internal chamber of the drip pump when the piston slides forward relative to the cylinder, wherein the pump mount defines a guide for receiving the drip pump to facilitate collapsing of the drip pump by ensuring that the drip pump remains in contact with the pump mount as the piston slides rearward, wherein the drip pump has a first end attached to the body of the pump head and a second end free from attachment to the pump mount.

17. A foaming pump in combination with a soap container in combination with a pump mount as set forth in claim 16 wherein the guide comprises at least one projection extending forward from the pump mount and defining a cavity for receiving the drip pump.

* * * * *